United States Patent
Mameda et al.

(10) Patent No.: US 7,986,646 B2
(45) Date of Patent: Jul. 26, 2011

(54) COMMUNICATION APPARATUS, COMMUNICATION METHOD, COMMUNICATION CIRCUIT, MOBILE PHONE, PROGRAM, AND COMPUTER READABLE RECORDING MEDIUM WITH PROGRAM RECORDED THEREIN

(75) Inventors: Kenji Mameda, Kashihara (JP); Fumihiro Fukae, Sakurai (JP); Hitoshi Naoe, Nara (JP); Tsukasa Kaminokado, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/445,713

(22) PCT Filed: Oct. 4, 2007

(86) PCT No.: PCT/JP2007/069489
§ 371 (c)(1),
(2), (4) Date: Apr. 15, 2009

(87) PCT Pub. No.: WO2008/047611
PCT Pub. Date: Apr. 24, 2008

(65) Prior Publication Data
US 2009/0190502 A1    Jul. 30, 2009

(30) Foreign Application Priority Data

Oct. 16, 2006  (JP) .................. 2006-281981

(51) Int. Cl.
*H04J 1/16* (2006.01)
*H04L 12/56* (2006.01)

(52) U.S. Cl. ......... 370/282; 370/252; 370/254; 370/278

(58) Field of Classification Search .................. 370/254, 370/252, 389, 282, 278
See application file for complete search history.

(56) References Cited

U.S. PATENT DOCUMENTS
4,957,348 A    9/1990 May
(Continued)

FOREIGN PATENT DOCUMENTS
CN    1167380 A    12/1997
(Continued)

OTHER PUBLICATIONS

H. Naoe et al., Standardization of IrSimple, a High-Speed Infrared Communications Protocol, Sharp Technical Journal, Feb. 2007, Fol. 95, pp. 63-68.
(Continued)

*Primary Examiner* — John Pezzlo
(74) *Attorney, Agent, or Firm* — Birch, Stewart, Kolasch & Birch, LLP

(57) ABSTRACT

A communication apparatus (1) is a primary station for communicating with a secondary station, and includes: a first protocol control section (111) for transmitting, at a time when communication connection is to be established with the secondary station, (i) a station discovery command with which to confirm a presence of the secondary station, and (ii) a first connect request command, after the station discovery command is transmitted, so as to carry out connection processing; second protocol control means (112) for transmitting, at a time when communication connection is to be established with the secondary station, a second connect request command so as to carry out connection processing; and a protocol switching section (113) for (i) causing the first protocol control section (111) to initially transmit the station discovery command, and in a case where a response to the station discovery command has not been received after an elapse of a predetermined time since the station discovery command was transmitted, (ii) causing the second protocol control section (112) to transmit the second connect request command.

22 Claims, 16 Drawing Sheets

U.S. PATENT DOCUMENTS

| | | | |
|---|---|---|---|
| 5,448,561 | A | 9/1995 | Kaiser et al. |
| 5,450,412 | A | 9/1995 | Takebayashi et al. |
| 5,509,121 | A | 4/1996 | Nakata et al. |
| 5,515,508 | A | 5/1996 | Pettus et al. |
| 5,557,634 | A | 9/1996 | Balasubramanian et al. |
| 5,563,943 | A | 10/1996 | Takebayashi et al. |
| 5,585,952 | A | 12/1996 | Imai et al. |
| 5,638,373 | A | 6/1997 | Takebayashi et al. |
| 5,706,110 | A | 1/1998 | Nykanen |
| 5,752,163 | A | 5/1998 | Robinson |
| 5,764,643 | A | 6/1998 | Takebayashi et al. |
| 5,850,189 | A | 12/1998 | Sakanaka et al. |
| 5,995,838 | A | 11/1999 | Oda et al. |
| 6,006,294 | A | 12/1999 | Kurihara |
| 6,034,962 | A | 3/2000 | Ohno et al. |
| 6,154,298 | A | 11/2000 | Tamagawa et al. |
| 6,178,181 | B1 | 1/2001 | Glitho |
| 6,188,431 | B1 | 2/2001 | Oie |
| 6,211,797 | B1 | 4/2001 | Kimura |
| 6,256,296 | B1 | 7/2001 | Ruziak et al. |
| 6,297,802 | B1 | 10/2001 | Fujioka |
| 6,336,142 | B1 | 1/2002 | Kato et al. |
| 6,347,339 | B1 | 2/2002 | Morris et al. |
| 6,411,813 | B1 | 6/2002 | Sano |
| 6,629,373 | B1 | 10/2003 | Donaldson |
| 6,728,774 | B1 | 4/2004 | Nykanen |
| 6,735,245 | B1 | 5/2004 | Palm et al. |
| 6,754,451 | B1 | 6/2004 | Nakamura |
| 6,812,881 | B1 | 11/2004 | Mullaly et al. |
| 6,839,564 | B2 | 1/2005 | Sutinen et al. |
| 6,842,433 | B2 | 1/2005 | West et al. |
| 6,865,687 | B1 | 3/2005 | Ichimi |
| 6,907,013 | B1 | 6/2005 | Ruziak |
| 6,944,483 | B1 | 9/2005 | Motohashi |
| 7,069,059 | B2 | 6/2006 | Osawa et al. |
| 7,363,534 | B1 | 4/2008 | Krishnamurthy et al. |
| 7,366,532 | B2 | 4/2008 | Khawand et al. |
| 7,403,543 | B2 | 7/2008 | Lee et al. |
| 7,411,974 | B2 | 8/2008 | Attar et al. |
| 7,729,290 | B2 * | 6/2010 | Saleh et al. .................. 370/254 |
| 2001/0007137 | A1 | 7/2001 | Suumaki et al. |
| 2001/0032326 | A1 | 10/2001 | Haneda |
| 2001/0044914 | A1 | 11/2001 | Nakano et al. |
| 2002/0065065 | A1 | 5/2002 | Lunsford et al. |
| 2002/0095589 | A1 | 7/2002 | Keech |
| 2002/0147003 | A1 | 10/2002 | Tada et al. |
| 2002/0196782 | A1 | 12/2002 | Furukawa et al. |
| 2002/0196812 | A1 | 12/2002 | Yamaguchi et al. |
| 2003/0050009 | A1 | 3/2003 | Kurisko et al. |
| 2003/0093503 | A1 | 5/2003 | Yamaki et al. |
| 2003/0107651 | A1 | 6/2003 | Chen et al. |
| 2003/0114107 | A1 | 6/2003 | Aoyagi |
| 2003/0169744 | A1 | 9/2003 | Elzur |
| 2004/0042487 | A1 | 3/2004 | Ossman |
| 2004/0054796 | A1 | 3/2004 | Kikuchi et al. |
| 2004/0080537 | A1 | 4/2004 | Adler |
| 2004/0081436 | A1 | 4/2004 | Tada et al. |
| 2004/0111535 | A1 | 6/2004 | Boucher et al. |
| 2004/0170134 | A1 | 9/2004 | Furuyama et al. |
| 2004/0186928 | A1 | 9/2004 | Fukunaga et al. |
| 2004/0218209 | A1 | 11/2004 | Hamaguchi et al. |
| 2004/0228332 | A1 | 11/2004 | Seguin et al. |
| 2005/0014468 | A1 | 1/2005 | Salokannel et al. |
| 2005/0025188 | A1 | 2/2005 | Numakura et al. |
| 2005/0049955 | A1 | 3/2005 | Kohnhorst et al. |
| 2005/0071733 | A1 | 3/2005 | Fukae et al. |
| 2005/0083885 | A1 | 4/2005 | Ikeda et al. |
| 2005/0091412 | A1 | 4/2005 | Pinkerton et al. |
| 2005/0097191 | A1 | 5/2005 | Yamaki et al. |
| 2005/0138226 | A1 | 6/2005 | Tateyama et al. |
| 2005/0254456 | A1 | 11/2005 | Sakai et al. |
| 2005/0271022 | A1 | 12/2005 | Osawa et al. |
| 2006/0143455 | A1 | 6/2006 | Gitzinger |
| 2006/0250973 | A1 | 11/2006 | Trott |
| 2006/0291502 | A1 | 12/2006 | Kalofonos |
| 2007/0057762 | A1 | 3/2007 | Han et al. |
| 2007/0064733 | A1 | 3/2007 | Osawa et al. |
| 2008/0008165 | A1 | 1/2008 | Ikeda et al. |
| 2008/0126554 | A1 | 5/2008 | Sakai et al. |
| 2008/0145058 | A1 | 6/2008 | Fukae et al. |
| 2008/0189422 | A1 | 8/2008 | Naoe et al. |
| 2008/0279560 | A1 | 11/2008 | Osawa et al. |
| 2008/0279562 | A1 | 11/2008 | Naoe et al. |
| 2008/0291941 | A1 | 11/2008 | Sakai et al. |
| 2008/0313518 | A1 | 12/2008 | Naoe et al. |
| 2009/0190502 | A1 | 7/2009 | Mameda et al. |
| 2009/0262661 | A1 * | 10/2009 | Ueda et al. .................. 370/254 |

FOREIGN PATENT DOCUMENTS

| | | | |
|---|---|---|---|
| CN | 1192637 | A | 9/1998 |
| CN | 1228902 | A | 9/1999 |
| CN | 1394029 | A | 1/2003 |
| EP | 0 584 464 | A1 | 3/1994 |
| EP | 0 886 410 | A2 | 12/1998 |
| EP | 1 780 984 | A1 | 5/2007 |
| JP | 54-144105 | | 11/1979 |
| JP | 58-56200 | A | 4/1983 |
| JP | 62-29238 | A | 2/1987 |
| JP | 62-029238 | A | 2/1987 |
| JP | 62-57342 | A | 3/1987 |
| JP | 62-261253 | A | 11/1987 |
| JP | 64-32360 | A | 2/1989 |
| JP | 10-98435 | A | 4/1989 |
| JP | 1-164140 | A | 6/1989 |
| JP | 02-016847 | A | 1/1990 |
| JP | 02-041050 | A | 2/1990 |
| JP | 2-281830 | A | 11/1990 |
| JP | 03-070059 | A | 3/1991 |
| JP | 03-098338 | A | 4/1991 |
| JP | 3-139935 | A | 6/1991 |
| JP | 4-839 | | 1/1992 |
| JP | 4-269031 | A | 9/1992 |
| JP | 4-271567 | A | 9/1992 |
| JP | 4-291556 | A | 10/1992 |
| JP | 05-030150 | A | 2/1993 |
| JP | 5-175985 | A | 7/1993 |
| JP | 05-260124 | A | 8/1993 |
| JP | 6-70383 | A | 3/1994 |
| JP | 6-152687 | A | 5/1994 |
| JP | 07-15485 | A | 1/1995 |
| JP | 07-046292 | A | 2/1995 |
| JP | 8-191271 | A | 7/1996 |
| JP | 8-195785 | A | 7/1996 |
| JP | 8314831 | A | 11/1996 |
| JP | 9-135210 | A | 5/1997 |
| JP | 2655404 | B2 | 5/1997 |
| JP | 9-154176 | A | 6/1997 |
| JP | 9-224069 | A | 8/1997 |
| JP | 9-284696 | A | 10/1997 |
| JP | 9-312674 | A | 12/1997 |
| JP | 10-98435 | A | 4/1998 |
| JP | 10-107737 | A | 4/1998 |
| JP | 10-126758 | A | 5/1998 |
| JP | 10-145452 | A | 5/1998 |
| JP | 10-163902 | A | 6/1998 |
| JP | 10-290348 | A | 10/1998 |
| JP | 10-308791 | A | 11/1998 |
| JP | 11-4306 | A | 1/1999 |
| JP | 11-154908 | A | 6/1999 |
| JP | 11-157908 | A | 6/1999 |
| JP | 11317724 | A | 11/1999 |
| JP | 2000-010745 | | 1/2000 |
| JP | 2000-31993 | A | 1/2000 |
| JP | 2000-32000 | A | 1/2000 |
| JP | 2000-69403 | A | 3/2000 |
| JP | 2000069403 | A | 3/2000 |
| JP | 2000-101605 | A | 4/2000 |
| JP | 2000-184467 | A | 6/2000 |
| JP | 2000-196622 | A | 7/2000 |
| JP | 2000-196654 | A | 7/2000 |
| JP | 2000-332688 | A | 11/2000 |
| JP | 2000-349782 | A | 12/2000 |
| JP | 2001-60912 | A | 3/2001 |
| JP | 2001-69297 | A | 3/2001 |
| JP | 2001-83948 | A | 3/2001 |
| JP | 2001-083948 | A | 3/2001 |
| JP | 2001-145164 | A | 5/2001 |

| | | | |
|---|---|---|---|
| JP | 2001-202281 A | 7/2001 |
| JP | 2001-308955 A | 11/2001 |
| JP | 2002-27019 A | 1/2002 |
| JP | 2002-51162 A | 2/2002 |
| JP | 2002-509378 A | 3/2002 |
| JP | 2002-135260 A | 5/2002 |
| JP | 2002-158730 A | 5/2002 |
| JP | 2002-223466 A | 8/2002 |
| JP | 2002-232507 A | 8/2002 |
| JP | 2003-69610 A | 3/2003 |
| JP | 2003-508728 A | 3/2003 |
| JP | 2003-101554 A | 4/2003 |
| JP | 2003-110579 A | 4/2003 |
| JP | 2003-218936 A | 7/2003 |
| JP | 2003-258880 A | 9/2003 |
| JP | 2003-263403 A | 9/2003 |
| JP | 2004-41375 A | 2/2004 |
| JP | 2004-64533 A | 2/2004 |
| JP | 2004-94555 A | 3/2004 |
| JP | 2004-104441 A | 4/2004 |
| JP | 2004177586 A | 6/2004 |
| JP | 2004-236108 A | 8/2004 |
| JP | 2004-343246 A | 12/2004 |
| JP | 2005-354652 A | 12/2005 |
| JP | 2006-211425 | 8/2006 |
| WO | WO 99/31814 A1 | 6/1999 |
| WO | WO-02/23885 A1 | 3/2002 |
| WO | WO-0223885 A1 | 3/2002 |
| WO | WO-2006/080357 A1 | 3/2006 |
| WO | WO 2006/080357 A1 | 8/2006 |
| WO | WO-2006080357 | 8/2006 |

OTHER PUBLICATIONS

H. Naoe et al, "IrDA Next Generation High-Speed Infrared Communications Standards 'IrSimple", The Institute of Image Electronic Engineers of Japan, vol. 35, pp. 598-602 (2006).

M. Matsumoto et al., "An Evaluation of the optical wireless system in mobile environment in the room", Technical Report of IEICE, The Institute of Electronics, Information and Communication Engineers, Jan. 28, 2000, pp. 1-7.

H. Naoe et al., "IrSimple Profile and Protocols At Infrared Data Association", pp. 617, IECE 2005 Society Conference Abstracts B-15-14 (2005).

G. Kitazumi et al., "A Proposal of next generation proximity infrared communication", Optimization of IrDA protocol by IrSimple—The Institute of Image Electronics Engineers of Japan.

Standardization Proposal of High Efficiency Protocols by using Infrared Data Association (IEICE Communications Society Conference 2005; Technical Reports published on Sep. 7, 2005) and presented PowerPoint documents.

High Efficiency Protocols (IrSimple) Using Infrared Communication (IEICE Communications Society Conference 2005; Technical Reports published on Sep. 7, 2005).

Infrared Data Association Serial Infrared Link Access Protocol (IrLAP) Version1.1 Jun. 16, 1996.

Infrared Data Association Link Management Protocol Version1.1 Jan. 23, 1996.

Infrared Data Association 'Tiny TP'; A Flow-Control Mechanism for use with IrLMP Version1.1 Oct. 20, 1996.

Infrared Data Association® (IrDA®) Object Exchange Protocol OBEX™ Version1.3 Jan. 3, 2003.

Infrared Data Association IrLAP Fast Connect (Application Note) Version 1. 0 (Nov. 27, 2002).

IrDA Sena: Infrared Sequence Management Protocol for IrSimple Version1.00 Oct. 14, 2005.

IrDA Serial Infrared Link Management Protocol Specification for IrSimple Addition Errata to IrLMP Version 1.1 Ver 1.00 Oct. 14, 2005.

IrSimple (Infrared Simple) Profile Version1.00 Oct. 14, 2005.

IrDA Serial Infrared Link Access Protocol Specification for IrSimple Addition Errata to IrLAP Version1.1 Version 1.00 Oct. 14, 2005.

Hitoshi Naoe et al., "Standardization of IrSimple, a High-Speed Infrared Communications Protocol", Sharp Technical Journal, vol. 95, pp. 63-68 Feb. 2007 URL: <http://www.sharp.co.jp/corporate/rd/03/pdf/95_13.pdf>.

Hitoshi Naoe et al., "IrDA Next Generation High-Speed Infrared Communications Standards "IrSimple"", Technical Report of IEICE, The Institute of Image Electronics Engineers of Japan, vol. 35, pp. 598-602, 2006.

Mitsuji Matsumoto et al., "An Evaluation of the Optical Wireless System in the Mobile Environment in the Room", Technical Report of IEICE, The Institute of Electronics, Information and Communication Engineers, pp. 1-7, Jan. 28, 2000.

Gontaro Kitazumi et al., "A Proposal of next generation proximity infrared communication—Optimization of IrDA protocol by IrSimple-" Institute of Image Electronics Engineers of Japan, IIEEJ Technical Report, 2 pages.

Hitoshi Naoe et al., "Standardization Proposal of High Efficiency Protocols by using Infrared Data Association", B-10-54, Conference Presentation, Institute of Electronics Information and Communication Engineers (IEICE), p. 344, Technical Reports published Sep. 7, 2005; with PowerPoint Presentation, Mar. 2005.

Hitoshi Naoe et al., "High Efficiency Protocols (IrSimple) Using Infrared Communication—IrSimple Profile and Protocols at Infrared Data Association", B-15-14, Conference Presentation, Institute of Electronics, Information and Communication Engineers (IEICE), 1 page. Technical Reports published Sep. 7, 2005; with PowerPoint Presentation, Mar. 2005.

"Infrared Data Association Serial Infrared Physical Layer Specification", Version 1.4, pp. i-iv & 1-60, May 30, 2001.

Timothy Willliams et al., "Infrared Data Association Serial Infrared Link Access Protocol (IrLAP)", Version 1.1, pp. 1-116, Jun. 16, 1996.

Andy Seaborne et al., "Infrared Data Association Link Management Protocol (IrLAP)", Version 1.1, pp. 1-98, Jan. 23, 1996.

Stuart Williams et al., "Infrared Data Association 'Tiny TP': A Flow-Control Mechanism for use with IrLMP" Version 1.1, pp. 1-17, Oct. 20, 1996.

Pat Megowan et al., "Infrared Data Association® (IrDA®) Object Exchange Protocol OBEX™", Version 1.3, pp. 1-95, Jan. 3, 2003.

Hitoshi Naoe et al., "Infrared Data Association IrDA Serial Infrared Sequence Management Protocol for IrSimple", Version 1.00, pp. 1-64, Oct. 14, 2005.

Hitoshi Naoe et al., "Infrared Data Association IrDA Serial Infrared Link Management Protocol Specification for IrSimple Addition-Errata to IrLMP Version 1.1", Version 1.00, pp. 1-27, Oct. 14, 2005.

Hitoshi Naoe et al., Infrared Data Association IrSimple (Infrared Simple) Profile, Version 1.00, pp. 1-30, Oct. 14, 2005.

Hitoshi Naoe et al., "Infrared Data Association IrDA Serial Infrared Link Access Protocol Specification for IrSimple Addition-Errata to IrLAP Version 1.1", Version 1.00, pp. 1-65, Oct. 14, 2005.

Kuniko Yamaguchi et al., "Implementation of IrSimple for Mobile Phones", B-15-15, Paper for Institute of Electronics, Information and Communication Engineers (IEICE), Communication Society Conference, 2005 p. 618.

Hitoshi Naoe et al., "IrSimple Profile and Protocols At Infrared Data Association", B-15-14, IECE Society Conference Abstracts, p. 617, 2005.

Glade Diviney et al., "Infrared Data Association IrLAP Fast Connect (Application Note)" Version 1.0, Nov. 27, 2002, pp. 1-17.

Office Action for co-pending U.S. Appl. No. 11/883,253 dated Jul. 26, 2010.

Office Action dated Nov. 30, 2010 for co-pending U.S. Appl. No. 10/577,337.

Office Action dated Jan. 7, 2011 for co-pending U.S. Appl. No. 11/883,253.

Office Action for co-pending U.S. Appl. No. 12/092,937 dated Oct. 27, 2010.

Office Action dated Feb. 23, 2011 for co-pending U.S. Appl. No. 12/092,937.

* cited by examiner

FIG. 9

| A field (C/R = 1 Addr=0x7F) | C field (SNRM) | Source device address | Destination device address (Global) | Connection Address | Requested-QoS Parameters | Upper User Data |

FIG. 10

| A field (C/R = 0 Addr=0xNN) | C field (UA) | Source device address | Destination device address | Responsed-QoS Parameters | Upper User Data |

FIG. 12

| A field (C/R = 1 Addr=0x7F) | C field (XID) | Format Identifier | Source device address | Destination device address (Global) | Discovery Flags | Slot Number | Version Number | Discovery Info (final slot only) |
|---|---|---|---|---|---|---|---|---|

FIG. 14

| A field (C/R = 0 Addr=0x7F) | C field (XID) | Format Identifier | Source device address | Destination device address | Discovery Flags | Slot Number | Version Number | Discovery Info |

FIG. 15

| A field (C/R = 1 Addr=0x7F) | C field (SNRM) | Source device address | Destination device address | Connection Address | Requested-QoS Parameters |
|---|---|---|---|---|---|

FIG. 16

| A field (C/R = 0 Addr=0xNN) | C field (UA) | Source device address | Destination device address | Responsed-QoS Parameters |

COMMUNICATION APPARATUS, COMMUNICATION METHOD, COMMUNICATION CIRCUIT, MOBILE PHONE, PROGRAM, AND COMPUTER READABLE RECORDING MEDIUM WITH PROGRAM RECORDED THEREIN

TECHNICAL FIELD

The present invention relates to a communication apparatus, a communication method, a communication circuit, a mobile phone, and a program, each of which for transmitting and receiving data, and a computer readable recording medium recorded with such a program.

BACKGROUND ART

Infrared methods such as IrDA (Infrared Data Association) are available as an interface for connecting a mobile phone with a television, a printer, or a PC (Personal Computer) (see Non Patent Literature 1 through 5).

IrDA and like infrared communications schemes are directional; if there is an obstacle between the communication apparatuses, data cannot be transferred. With a line of sight between the apparatuses, however, a high speed data transfer is possible. IrDA standards include Very Fast IR (VFIR) with a maximum transfer rate of 16 Mbps, Fast IR (FIR) with a maximum transfer rate of 4 Mbps, and Serial IR (SIR) with a transfer rate of up to 115.2 (inclusive of 115.2 kbps). Currently available IrDA standards on the market are those with a maximum transfer rate of up to 4 Mbps.

An IrDA connection routine for the IrLAP layer will be described in reference to FIG. 6 illustrates a signal sequence for the establishment of an IrLAP layer connection as specified by IrDA.

A primary station, or device, is a station which initiates a discovery of an opposite station, that is, which requests an establishment of a data transfer state, and is a station which transmits a station discovery command (XID (exchange station identification) command). A secondary station, or device, is a station which receives the request, and is a station which transmits a station discovery response (XID response) to the station discovery command. A request or instruction transmitted from the primary station to the secondary station is termed as a command. A reply to the command, transmitted the other way from the secondary station to the primary station, is termed as a response.

The XID command is a command with which to discover a secondary station candidate within the communications range of the primary station. The numbers in parentheses are SlotNumbers in hexadecimal notation. The Slotnumbers indicate the transmission sequence of commands.

Upon receiving an XID command, the secondary station returns an XID response, informing the primary station of its presence. The primary station transmits a specified number of XID commands. The primary station then sets the SlotNumber of the last XID command to 0xFF, a number indicating that the command is the last one (XID-End).

The primary station forwards, in an SNRM (set normal response mode) command, its maximum transfer rate, maximum incoming data length, and other necessary parameters for communications to the secondary station. Receiving the command, the secondary station compares the parameters to its own settings and informs the primary station of acceptable settings in a UA response.

After establishing an IrLAP connection using IrLAP command packets, IrLMP, TinyTP, and OBEX connections are negotiated using IrLAP data packets.

An IrLMP connect request is forwarded via IrLAP data packets from the primary station to the secondary station. An IrLMP connect response is returned via IrLAP data packets from the secondary station to the primary station, establishing an IrLMP connection.

Next, a TinyTP connect request is forwarded to the secondary station via the IrLAP data packets. A TinyTP connect response is returned from the secondary station is transferred to the primary station via the IrLAP data packets, establishing a TinyTP connection.

Furthermore, an OBEX connect request is forwarded via IrLAP data packets from the primary station to the secondary station. An OBEX connect response is returned from the secondary station to the primary station, establishing an OBEX connection. That renders the stations ready for user data transfer.

For disconnection, an OBEX disconnect request and response, a TinyTP disconnect request and response, and an IrLMP disconnect request and response are exchanged via IrLAP data packets. A DISC command (IrLAP disconnect request command packet) and a UA response (IrLAP respond command packet) are then exchanged. The exchanges disconnect the primary station from the secondary station.

The IrDA connection routine above takes an extended period of time before the stations are ready for user data transfer, lowering transfer efficiency. Specifically, IrDA specifies that station discovery through sensing and using XID commands, and negotiation parameter exchange using an SNRM command and a UA response are needed before the establishing of a connection. IrDA stipulates that the transfer rate be limited to 9,600 bps during the XID-based station discovery. The rate is far lower than the user data transfer rate (4 Mbps). In addition, as mentioned above, after the IrLAP layer has been connected, the IrLMP, TinyTP, and OBEX layers need to be sequentially connected so that the stations are ready for data transfer. As such, an overhead for carrying out data transmission becomes great. Hence, the IrDA is not suitable for efficiently transmitting and receiving a large volume of data.

Accordingly, as a measure for improvement in convenience in infrared communications, a communication protocol "IrSimple" was standardized in the year 2005. This "IrSimple" reduces the time taken to establish a connection to achieve high efficiency in communications, from the issuing of a connect request to disconnecting (see Non Patent Literature 6 through 8, and Patent Literature 1). Although the IrSimple is developed from IrDA with improvements in some functionality, the IrSimple involves no communications in relation to station discovery, taking less time to establish a connection than conventional IrDA. IrSimple reduces communications time by a factor of 4 to 10 over conventional IrDA for the same volume of data.

"IrSimple" provides for two communication modes: unidirectional communications and bidirectional communications. In unidirectional communications, the connect and disconnection routines are so simplified as to be complete by carrying out just one pair of packet exchange, to reduce connect and disconnect times. The retransmission routine upon error detection in data transfer is also simplified to achieve high transfer rates.

An IrSimple connection routine for the IrLAP layer in unidirectional communications will be described in reference to FIG. 7 illustrates an IrSimple-compliant signal sequence for the establishment of an IrLAP layer connection in unidirectional communications. As shown in FIG. 7, a primary station sends an SNRM command (connect request command) without sending a station discovery command with which to confirm the presence of a secondary station. The primary station, having sent the SNRM command, starts a data transfer without waiting for a UA response (response command packet) from the secondary station. Meanwhile, having received the SNRM command, the secondary station waits for the data transfer from the primary station without returning a UA response. If the incoming SNRM command includes no data for upper layers, the secondary station may dismiss it as an illegal connect request and not enter a data transfer standby state.

Next, an IrSimple connection routine for the IrLAP layer in bidirectional communications will be described in reference to FIG. 8 illustrates an IrSimple-compliant signal sequence for the establishment of an IrLAP layer connection in bidirectional communications.

As shown in FIG. 8, the primary station sends an SNRM command (connect request command) without sending a station discovery command with which to confirm the presence of a secondary station. Having received the SNRM command, the secondary station sends a UA response (response command packet). As the primary station receives the UA response, the connecting of the LAP, LMP, SMP, and OBEX layers are all completed. That is to say, the LMP, SMP, and OBEX layers do not need to be sequentially connected after the LAP layer is connected.

The following description explains the SNRM command specified in the IrSimple protocols, with reference to FIG. 9. FIG. 9 is an explanatory view illustrating a frame containing the SNRM command.

The "A (Address) field" is a field to be used to negotiate a connection and contains a 7-bit connection address and a 1-bit C/R (Command/Response) identifier. In FIG. 8 where a pre-connection SNRM command is shown, since the connection is not established yet, the connection address is "0x7F" which indicates a broadcast address. The C/R bit is set as "1", indicating that this packet is a command. The A field in the SNRM command in FIG. 8, a combination of the address and the C/R bit, is "0xFF".

The "C (Control) field" is a control field for the packet. Since the packet is an SNRM command, the C field value is either "0x93" for bidirectional communication or "0x83" for unidirectional communication, both indicating an SNRM in unnumbered format (U format). FIG. 8 shows a sequence in bidirectional communication; therefore the C field value is "0x93".

The "Source Address" is a field indicating the address of the source device (primary station), and assumes a value other than "0" and "0xFFFFFFFF".

The "Destination device Address" is a field indicating the address of the destination device (secondary station). In FIG. 8 where a pre-connection SNRM command is shown, since the connection is not established yet, the destination device address is equal to "0xFFFFFFFF" which indicates a broadcast address.

The "Connection device Address" contains a new 7-bit connection address used after successfully establishing a connection and a 1-bit C/R bit which is always set to "0". The connection address is set to any value by the primary station.

The "Requested-QoS Parameters" is a field indicating QoS (Quality of Service) parameter values, including the transfer rate and a maximum turnaround time supported by the primary station.

The "Upper User Data" is a field describe the data used by the layers above the IrLAP layer. For example, the Upper User Data describes an SMP parameter, a CONNECT command (OBEX connect request), and the like.

The following description explains the UA response specified in the IrSimple protocols, with reference to FIG. 10. FIG. 10 is an explanatory view illustrating a UA response frame.

The "A (Address) field" contains the 7-bit address specified in the "Connection device Address" of the corresponding SNRM command. The "A field" also contains a 1-bit C/R bit which is set to "0", indicating that this packet is a response.

The "C (Control) field" is set to "0x73", an indication of a UA response in unnumbered format (U format), because this packet is a UA response packet.

The "Source device Address" is the 32-bit address determined by the secondary station and assumes a value other than "0" and "0xFFFFFFFF".

The "Destination device Address" is a field indicating the address of the destination device (primary station) which is equal to the address of the primary station communicated in the Source device Address of the corresponding SNRM command packet.

"Responsed-QoS Parameters" is a field containing QoS parameters determined from the Requested-QoS Parameters given by the primary station and the QoS parameters of the secondary station.

"Upper User Data" is a field to describe the data used by the layers above the IrLAP layer. For example, the "Upper User Data" includes SMP (upper layer) parameters and a Success response to the OBEX connect request.

A communication apparatus which strictly adheres to both the IrDA and IrSimple protocol specifics, when a connection between a communication apparatus of the secondary station is attempted, automatically switches between the protocols (see Non Patent Literature 6) in accordance with a reaction from the secondary station. That is to say, the communication apparatus connects to the secondary station based on the IrDA protocols when the secondary station responds to the IrDA protocols, and when the secondary station responds to IrSimple bidirectional communications, the secondary station connects based on the IrSimple bidirectional communications.

The following description explains a routine for the communication apparatus to switch between the IrSimple protocol and the IrDA protocol with reference to FIG. 11. FIG. 11 is a signal sequence followed when the communication apparatus switches between IrSimple and IrDA.

The primary station attempts to connect to the secondary station by repeating the routines (1) to (3) described below. The SNRM command and the XID command below are transmitted at 9,600 bps.

(1) The primary station attempts to connect based on the IrSimple protocol. Thus, the primary station transmits the SNRM command as specified in the IrSimple protocols.

(2) If the secondary station does not respond, the primary station attempts to connect based on the IrDA protocol. Thus, the primary station transmits a 1-slot XID command to discover the secondary station.

(3) If the secondary station does not respond, the primary station terminates the station discovery by transmitting an XID-End command and makes another attempt to connect based on the IrSimple protocols. Thus, the primary station transmits an SNRM command as specified in the IrSimple protocols.

A frame arrangement of the SNRM command which is transmitted in the routines (1) to (3) is the same as FIG. 9.

The secondary station which receives the packets that are successively sent thereto responds to this packet if the packet received is a legal packet specified by a protocol supported by the secondary station. That is to say, if the secondary station supports the IrSimple protocol, a UA response is returned to an SNRM command of the routine (1) or (3), and if the secondary station supports the IrDA protocol, an XID response is returned to an XID command of the routine (2). Further, if the secondary station supports both the IrSimple and IrDA protocol specifics, a stipulation in the IrSimple protocol is applied in how to respond. The IrSimple protocol stipulates that the secondary station returns no XID response frame unless it receives two XID command (SlotNumber 0x00)s (see Non Patent Literature 6). Due to this stipulation, the XID response packet is not returned straight away even if the packet of the routine (1) is missed and the packets from the routine (2) are received. As a result, such secondary station returns the UA response to the IrSimple SNRM command of the routine (3), and as a result establishes a connection based on the IrSimple protocol.

The following description explains the XID command (IrDA station discovery command) with reference to FIG. 12. FIG. 12 is an explanatory view illustrating a frame of the XID command issued in the routine (2).

The "A field" is the same as the one described above; its value is "0xFF".

The "C field" is the same as the one described above; its value is "0x3F", indicating an XID command frame.

The "format Identifier" is an extension identifier, typically equal to "0x01".

The "Source device Address" field is the same as the one described above.

The "Destination device Address" field is the same as the one described above.

The "Discovery Flags" is a field indicating the number of slots of an XID command (a number of opposite stations simultaneously searched for). In the example shown in FIG. 11, the XID command has 1 slot; the discovery flags field contains a value "0x00".

The "Slot Number" is a field indicating the current slot number. The numbers are assigned sequentially. The Slot Number of the first XID command packet in FIG. 11 is "0x00". For the XID-End command packet which is the last XID command packet, the Slot Number is "0xFF", which indicates that this packet is the last packet.

The "Version Number" is a field indicating the version number of the IrLAP. For version 1.1, the Version Number is "0x00".

The "Discovery Info" is a field that is appended only to the XID-End command packet which is the last command. This field contains any information obtained in the station discovery, including station information such as the device name of the primary station.

A signal sequence followed when the secondary station strictly adhering to the IrSimple bidirectional communications connects to the primary station strictly adhering to both the IrDA and IrSimple protocol specifics, is as similar to FIG. 8. That is to say, the primary station sends the SNRM command (connect request command) without sending a station discovery command with which to confirm the presence of the secondary station. Having received the SNRM command, the secondary station sends a UA response (response command packet). As the primary station receives the UA response, the connecting of the LAP, LMP, SMP and OBEX layers are all completed.

The SNRM command is transmitted at 9600 bps, and the UA response is transmitted at 115.2 kbps. Therefore, the primary station waits for the UA response, ready to inbound frames at 115.2 kbps, after transmitting the SNRM command.

The following description explains a connection routine for a communication apparatus which strictly adheres to both the IrDA and IrSimple protocol specifics and another communication apparatus which strictly adheres only to the IrDA protocol specifics with reference to FIG. 13. FIG. 13 is a signal sequence followed when the primary station strictly adhering to both the IrDA and IrSimple protocol specifics connects to the secondary station which strictly adheres to only the IrDA protocol specifics.

As illustrated in FIG. 13, the primary station transmits an SNRM command (connect request). The secondary station however does not respond to this packet for the following reason. A packet in which both the "A field" and the "Destination device Address" contain a broadcast address (hereinafter referred to as "broadcast packet") is not a legal packet specified in the IrDA protocol. The IrDA protocol stipulates that a device return no response to such an illegal packet (see Non Patent Literature 1).

The SNRM command issued by the primary station in FIG. 13 is a broadcast frame; the secondary station, strictly adhering to the IrDA protocol specifics, does not respond to the SNRM command.

Receiving no response to the SNRM command issued, the primary station switches to the IrDA protocols to negotiate a connection and transmits an XID (0x00) command (IrDA station discovery packet). The secondary station responds to the XID (0x00) command, and transmits an XID response.

The following description explains the XID response (IrDA station discovery response) with reference to FIG. 14. FIG. 14 is an explanatory view illustrating a frame of a XID response packet.

The "A field" is the same as the one described above. The A field is "0xFE", indicating a response packet.

The "C field" is the same as the one described above. The C field is "0x3F", indicating an XID response packet.

The "format Identifier" field is the same as the one described above; its value is "0x01".

The "Source device Address" is a field indicating the address of the source device (secondary station), and assumes a value other than "0" and "0xFFFFFFFF".

The "Destination device Address" is a field indicating the address of the destination device (primary station). In this case, the Destination device Address is equal to the address of the primary station communicated in the Source device Address of the XID command packet.

The "Discovery Flags" is a field as same as the one described above and contains the same value as the Discovery Flags in the XID command packet. For example, if the Discovery Flags of the XID command packet is "0x00", the Discovery Flags of the XID response are also "0x00".

The "Slot Number" is a field as the same as the one described above and contains the same value as the Slot Number of the corresponding XID command packet. For example, if the Slot Number of the XID command is "0x00", the response has a slot number of "0x00".

The "Version Number" is a field as same as the one described above.

The "Discovery Info" is a field as same as the one described above and contains, for example, station information such as the device name of the secondary station.

After receiving the XID response, the primary station transmits an XID-End command, thereby terminating the station discovery.

Next, the primary station transmits an SNRM command (IrDA connect request). The following description explains an IrDA SNRM command in reference to FIG. 15 is an explanatory view illustrating a frame of the SNRM command packet.

The frame arrangement is substantially the same as the one shown in FIG. 9, except that its Destination device address has the same value as the Source Device Address in the XID response packet during the station discovery. Moreover, no Upper User Data is contained.

In the SNRM command, neither the A field nor the Destination device Address contain a broadcast address. Thus, the secondary station receives this SNRM command as a legal packet specified in the IrDA protocol, and transmits a UA response.

The following description describes the UA response in reference to FIG. 16 is an explanatory view illustrating a frame of a UA response packet. The frame arrangement is substantially the same as the one shown in FIG. 10, except that no Upper User Data is contained.

The primary station receives the UA response, thereby successfully establishing an IrLAP layer connection. Subsequently, connection in the layers above the LAP layer is negotiated.

The XID command packet, XID response packet, SNRM command packet, and UA response packet are all transmitted at 9,600 bps in the station discovery and connecting based on the IrDA protocol. Therefore, after transmitting an XID command packet or an SNRM command packet, the primary station waits for an XID response packet or a UA response packet, ready to inbound packets at 9,600 bps.

As explained above, the communication apparatus which strictly adheres to both the IrDA and IrSimple protocol specifics is capable of connecting to and communicating with a secondary station which strictly adheres to the IrDA protocol specifics or the IrSimple protocol specifics.

Nevertheless, some communication apparatuses do not strictly adhere to the IrDA protocol specifics; they return an IrDA UA response when they receive a broadcast packet. Such a device will be hereinafter referred to as an illegal response sender device. The communication apparatus which strictly adheres to both the IrDA and IrSimple protocol specifics cannot communicate with the illegal response sender device.

The following description explains how a communication apparatus which strictly adheres to both the IrDA and IrSimple protocol specifics attempts to connect to an illegal response sender device with reference to FIG. 17 is signal sequence followed when a primary station, or a communication apparatus which strictly adheres to both the IrDA and IrSimple protocol specifics, attempts to connect to another station, or an illegal response sender device.

As described in FIG. 13, the primary station first sends an SNRM command (IrSimple connect request) and then waits for a UA response from the secondary station at 115.2 kbps.

The A field and the Destination device Address of the SNRM command both contain a broadcast address. Again as described earlier, secondary stations which strictly adhere to the IrDA protocol specifics regard the SNRM command as a broadcast packet and do not return a UA response. The illegal response sender device however recognizes the SNRM command as an IrDA SNRM packet in the violation of the protocols and returns a UA response at 9600 bps.

Meanwhile, the primary station is waiting for a UA response packet at 115.2 kbps, and thus fails to detect the UA response that is transmitted at 9600 bps. Due to lack of a response from the secondary station, the primary station transmits an XID command at 9600 bps as shown in FIG. 11.

On the other hand, the secondary station completed its part of the connection routine upon transmission of the UA response. Therefore, the secondary station is waiting for a next packet (i.e., a connect request packet from the layer above the LAP layer) at the negotiated rate. Therefore, the secondary station cannot detect the XID command transmitted by the primary station at 9600 bps and continues to wait for a packet.

Due to the lack of response to the XID command, the primary station transmits another SNRM command (IrSimple connect request) as shown in FIG. 11, to which the secondary station cannot respond because it is still waiting for a connect request packet from the layer above the LAP layer.

Hence, neither the primary station nor the secondary station can receive a packet transmitted from the opposite station. In due course, a timeout occurs in the stations. The connection attempt thus fails and terminates.

As described above, the communication apparatus which strictly adheres to both the IrDA and IrSimple protocol specifics may fail to communicate with the illegal response sender device.

Citation List

Non Patent Literature 1

Infrared Data Association Serial Infrared Link Access Protocol (IrLAP) Version 1.1 (Jun. 16, 1996)

Non Patent Literature 2

Infrared Data Association Serial Infrared Link Management Protocol (IrLMP) Version 1.1 (Jan. 23, 1996)

Non Patent Literature 3

Infrared Data Association 'Tiny TP': A Flow-Control Mechanism for use with IrLMP Version 1.1 (Oct. 20, 1996)

Non Patent Literature 4

Infrared Data Association Object Exchange Protocol Version 1.3 (Jan. 3, 2003)

Non Patent Literature 5

Infrared Data Association IrLAP Fast Connect (Application Note) Version 1.0 (Nov. 27, 2002)

Non Patent Literature 6

IrDA Serial Infrared Link Access Protocol Specification for IrSimple Addition Version 1.0 (Oct. 14, 2005)

Non Patent Literature 7

IrDA Serial Infrared Link Management Protocol Specification for IrSimple Addition Version 1.0 (Oct. 14, 2005)

Non Patent Literature 8

IrDA Serial Infrared Sequence Management Protocol for IrSimple Version 1.0 (Oct. 14, 2005)

Patent Literature 1

International Publication No. 2006/080330 pamphlet (published on Aug. 3, 2006)

SUMMARY OF INVENTION

The present invention is accomplished in view of the above problems, and its object is to provide a first communication apparatus supporting both first and second protocols and which is capable of communicating with a second communication apparatus supporting a first protocol, which second communication apparatus returns a response of the first protocol at a time when a second connect request command is initially received, a communication method, a communication circuit, a mobile phone, a program for operating the communication method, and a computer-readable program in which such a program is recorded.

In order to attain the object, a communication apparatus according to the present invention is a communication apparatus which serves as a primary station for communicating with a secondary station, the communication apparatus including: first protocol control means for transmitting (i) a station discovery command with which to confirm a presence of the secondary station, and (ii) a first connect request command, after the station discovery command is transmitted and when a response to the station discovery command is received, so as to carry out connection processing; second protocol control means for transmitting a second connect request command so as to carry out a connection processing, without transmitting a station discovery command for confirming a presence of the secondary station; and protocol switching means for causing the second protocol control means to transmit the second connect request command, in a case where a response to the station discovery command has not been received after an elapse of a predetermined time since the station discovery command was transmitted before transmission of the second connect request command.

Moreover, a communication method according to the present invention includes the steps of: (a) transmitting (i) a station discovery command with which to confirm a presence of the secondary station, and (ii) a first connect request command, after the station discovery command is transmitted and when a response the station discovery command is received, so as to carry out connection processing; (b) transmitting a second connect request command so as to carry out connection processing, without transmitting a station discovery command for confirming a presence of the secondary station; and (c) causing the second connect request command to be transmitted in the step (b), in a case where a response to the station discovery command has not been received after an elapse of a predetermined time since the station discovery command was transmitted before transmission of the second connect request command.

According to the arrangement, a primary station attempts establishment of a connection by switching between a first protocol station discovery command and a second protocol station discovery command, so that a connection can be established with a secondary station regardless of whether the secondary station supports the first protocol or the second protocol. Furthermore, the primary station initially transmits the station discovery command. Thus, in a case where the secondary station strictly adheres to just the first protocol specifics, the secondary station returns a response to the station discovery command. In a case where the secondary station strictly adheres to (a) just the second protocol specifics or (b) the first and second protocol specifics however prioritizing the second protocol specifics, even if the primary station initially transmits the station discovery command, the secondary station does not respond to the station discovery command. This allows the secondary station to return a response to a subsequently transmitted second connect request command. Furthermore, even in the case where the secondary station is an illegal response sender device which returns a response based on the first protocol when the second connect request command is received, the primary station initially transmits the station discovery command; thus, the secondary station can return a response to the station discovery command.

Hence, in any of the cases where the secondary station (i) strictly adheres to the first protocol specifics, (ii) strictly adheres to the second protocol specifics, (iii) strictly adheres to the first and second protocol specifics however prioritizing the second protocol specifics, and (iv) is an illegal response sender device, the secondary station assuredly returns a response to the primary station since the primary station initially transmits the station discovery command and not the second connect request command, when establishing connection between the primary station and any one of the foregoing secondary stations.

As such, the primary station can be assuredly connected to the secondary station. Particularly, the communication apparatus or the communication method assures connection with an illegal response sender device based on the first protocol.

Moreover, a communication apparatus according to the present invention is a communication apparatus which serves as a primary station for communicating with a secondary station, wherein the communication apparatus is switchable between a first protocol and a second protocol at a time when communication connection is to be established with the secondary station, the first protocol causing transmission of (i) a station discovery command with which to confirm a presence of the secondary station, and (ii) a first connect request command, after the station discovery command is transmitted and when a response the station discovery command is received, for carrying out data communication based on the first protocol, so as to carry out connection processing, and the second protocol causing transmission of a second connect request command for carrying out data communication based on the second protocol, the station discovery command is transmitted before the second connect request command is transmitted, and in a case where a response to the station discovery command is received, a first connect request command is transmitted, the second connect request command is transmitted in a case where the response to the station discovery command has not been received after an elapse of a predetermined time since the station discovery command was transmitted.

According to the arrangement, the primary station is switchable between a station discovery command of the first protocol and a second connect request command of the second protocol. Further, the primary station transmits the station discovery command before the second connect request command is transmitted, regardless of whether the secondary station supports the first protocol or the second protocol. Thus, in a case where the secondary station strictly adheres to just the first protocol specifics, it is possible for the secondary station to return a response to the station discovery command. In a case where the secondary station strictly adheres to (a) just the second protocol specifics or (b) the first and second protocols specifics however prioritizing the second protocol specifics, the secondary station does not respond to the station discovery command, however can return a response to the second connect request command that is subsequently transmitted. Furthermore, even in the case where the secondary station is a illegal response sender device which returns a response based on the first protocol when the second connect request command is received, the secondary station can return a response to the station discovery command, since the primary station transmits the station discovery command before the second connect request command is transmitted.

Hence, in any of the cases where the secondary station (i) strictly adheres to the first protocol specifics, (ii) strictly adheres to the second protocol specifics, (iii) strictly adheres to the first and second protocol specifics however prioritizing the second protocol specifics, and (iv) is a illegal response sender device, the secondary station assuredly returns a response to the primary station since the primary station transmits the station discovery command before the second connect request command is transmitted, at a time when connection between the primary station and any one of the foregoing secondary stations is to be established.

As such, the primary station can be assuredly connected to the secondary station. Particularly, the communication apparatus or the communication method assures connection with an illegal response sender device based on the first protocol.

The communication apparatus may be realized by a computer. In this case, a control program of the communication apparatus which causes the computer to function as means of the communication apparatus, and a computer-readable storage medium are also included in the scope of the present invention.

BRIEF DESCRIPTION OF DRAWINGS

FIG. 9 is an explanatory view illustrating an IrSimple SNRM command format.

FIG. 10 is an explanatory view illustrating an IrSimple UA response format.

FIG. 12 is an explanatory view showing an IrDA XID command format.

FIG. 14 is an explanatory view showing an IrDA XID response format.

FIG. 15 is an explanatory view showing an IrDA SNRM command format.

FIG. 16 is an explanatory view showing an IrDA UA response format.

REFERENCE SIGNS LIST 1 communication apparatus (primary station)
2 communication apparatus (secondary station)
103 message presenting section (message presenting means)
111 IrDA-LAP control section (first protocol control section) (first protocol control means)
112 IrSimple-Lap control section (second protocol control section) (second protocol control means)
113 protocol switching section (protocol switching means)

DESCRIPTION OF EMBODIMENTS

One embodiment of the present invention is described below with reference to FIGS. 1 through 5.

When a specific example is used in the explanation of the embodiment, a first protocol is indicative of IrSimple, and a second protocol is indicative of IrDA. Of course, the first protocol is not limited to the IrSimple, and the second protocol is not limited to the IrDA. Namely, the first protocol is a protocol in which a station discovery command with which to confirm a presence of a secondary station is not required, and the second protocol is a protocol which requires the station discovery command with which to confirm a presence of the secondary station.

Note that, in the present embodiment, a physical layer may be worded as PHY, a data link layer may be worded as LAP, a network layer may be worded as LMP, a transport layer may be worded as SMP, and a session layer+presentation layer may be worded as OBEX.

Figure 2:
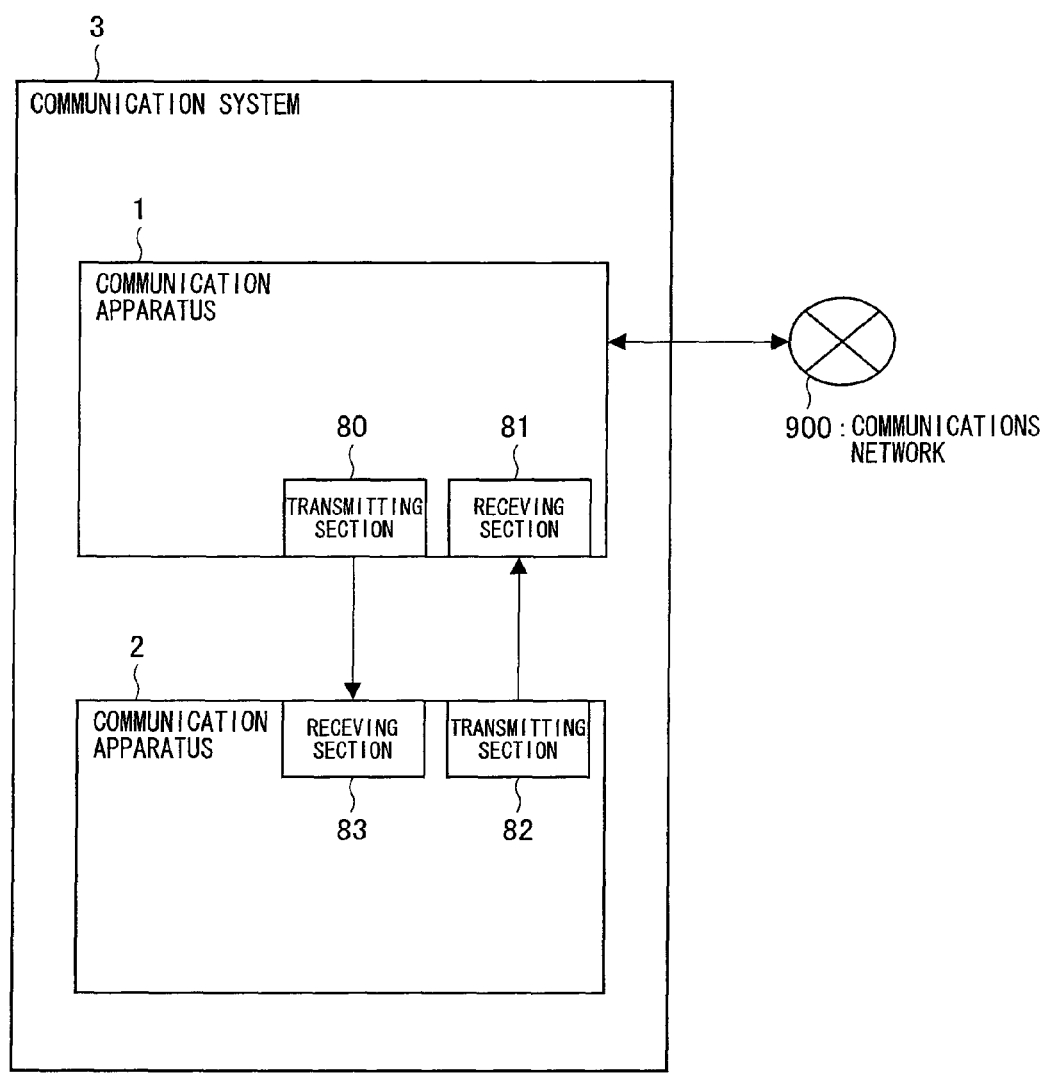
FIG. 2 is a block diagram showing an essential part of an arrangement of a communication system using a communication apparatus that is one embodiment of the present invention.

The following description explains a communications system 3 which uses a communication apparatus according to the present invention, with reference to FIG. 2 is a block diagram illustrating an arrangement of the communications system 3 including a communication apparatus 1 which is the communication apparatus according to the present invention, and a communication apparatus 2.

The communication apparatus 1 is, for example, a digital camera that transmits photographed image data to the communication apparatus 2, or a mobile phone that transmits, to the communication apparatus 2, e-mail data, address data, schedule data or the like. The communication apparatus 2 is, for example, a television that displays image data received from the communication apparatus 1, or a PC that stores e-mail data, address data, and schedule data, each of which is received from communication apparatus 1.

Moreover, the communication apparatus 2 is any one of (1) a communication apparatus which supports the IrDA protocol however does not strictly adhere to the IrDA protocol specifics (hereinafter referred to as "illegal response sender device"), which communication apparatus returns a UA response to a packet in which both the "A field" and the "Destination device Address" contain a broadcast address (hereinafter referred to as "broadcast packet"); (2) a communication apparatus which strictly adheres to just the IrDA protocol specifics, (3) a communication apparatus which strictly adheres to just the IrSimple protocol specifics, and (4) a communication apparatus which strictly adheres to both the IrDA and IrSimple protocol specifics.

The communication apparatuses 1 and 2 can mutually communicate with each other, by transmitting data from a transmitting section 80 to a receiving section 83 and from a transmitting section 82 to a receiving section 81, via wireless communication which uses infrared radiation.

The transmitting sections 80 and 82, for instance, is compliant with the IrDA standards, and is capable of transmitting data externally, via wireless communications which uses infrared radiation. The foregoing explains the IrDA standards as the wireless communication method, however the method is not limited to this.

The receiving sections 81 and 83, for instance, is compliant with the IrDA standards, and is capable of receiving data externally, via wireless communications which uses infrared radiation. The foregoing explains the IrDA standards as the wireless communication method, however the method is not limited to this.

The communication apparatus 1 is connected to a communications network 900. The communication apparatus 1 may be communicable with an external communication apparatus (not illustrated) via the communications network 900. In a case where the communication apparatus 1 is connected to the communications network 900, the communication apparatus 1 can transmit to and receive from the external communication apparatus (not illustrated), audio data, e-mail data, image data and the like.

The communications network 900 here is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network 900 is not limited in any particular manner, and may be, for example, wired line, such as IEEE 1394, USB, electric power line, cable TV line, telephone line, or ADSL line; or wireless, such as infrared radiation (IrDA, remote control), Bluetooth®, 802.11 wireless, HDR, mobile telephone network, satellite line, or terrestrial digital network. In the present embodiment, the communications network 900 is a mobile phone network.

Figure 1:
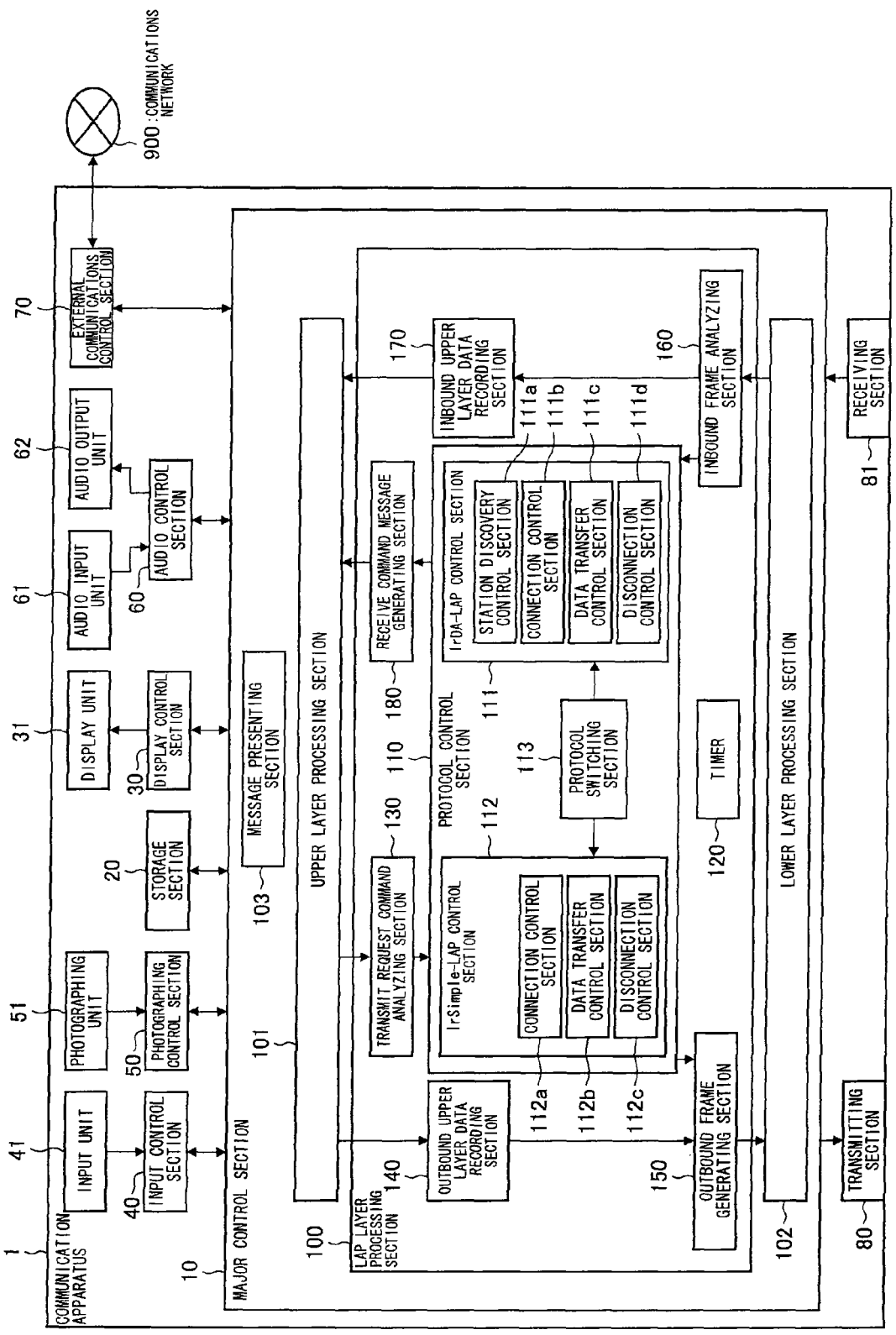
FIG. 1 is a block diagram showing an essential part of an arrangement in a communication apparatus which is one embodiment of the present invention.

The following description explains an arrangement of the communication apparatus 1 with reference to FIG. 1 is a block diagram illustrating an arrangement of the communication apparatus 1 according to one embodiment.

As illustrated in FIG. 1, the communication apparatus 1 includes a major control section 10, a storage section 20, a display control section 30, a display unit 31, an input control section 40, an input unit 41, a photographing control section 50, a photographing unit 51, an audio control section 60, an audio input unit 61, an audio output unit 62, an external communications control section 70, a transmitting section 80, and a receiving section 81.

The major control section 10 controls the display control section 30, the input control section 40, the photographing control section 50, the audio control section 60, the external communication control section 70, the transmitting section 80, and the receiving section 81. The major control section 10 carries out control by executing a program stored in the storage section 20, and carries out a predetermined arithmetic processing. An example of the predetermined arithmetic processing is the making of a connect request to another communication apparatus. The major control section 10 is constructed of, for example, a memory not illustrated (for example a RAM (Random Access Memory)) in which the program stored in the storage section 20 is loaded, and a CPU (Central Processing Unit) not illustrated for executing the program thus loaded in the memory. The memory is made of, for example a semiconductor memory, and stores data required for processing the input control section 40, the photographing control section 50, the transmitting section 80, the receiving section 81, and the CPU. Specific details of the major control section 10 is later described.

The storage section 20 stores, for example, a program to be executed by the CPU in the major control section 10, setting data and input data to be used by the program, data acquired by executing the program, data to be transmitted to the communication apparatus 2, and the like, and is made of a nonvolatile memory such as a ROM (Read-Only Memory) or a flash memory. The data to be stored in the storage section 20 encompass: image data read from the photographing unit 51, e-mail data, address data, and schedule data that are entered from the input unit 41, a message to be presented by a message presenting section (message presenting means) 103 later described, e-mail data received from an e-mail receiving section not illustrated, image data, image data received by the communication apparatus 1 as a secondary station from another communication apparatus via the receiving section 81, and the like.

The display unit 31 displays information sent from the display control section 30. The display unit 31 is constructed of, for example, an LCD (Liquid Crystal Display). Information that is displayed on the display unit 31 encompass: an operation menu presented to an operator of the communication apparatus 1, image data of which the operator of the communication apparatus 1 attempts to transmit, a message to be transmitted from the message presenting section 103, and the like.

The display control section 30 controls the display unit 31, and transmits to the display unit 31 information instructed by the major control section 10.

The input unit 41 accepts an entering operation by the operator of the communication apparatus 1. The input unit 41 sends an input signal in accordance with the entering operation to the input control section 40. The input unit 41 is constructed of, for example, an entering device such as a button (key), a switch, a touch panel or the like provided on a surface of the communication apparatus 1. The operator entering the operations via the input unit 41 allows generation of data such as e-mail, an address book, a schedule book or the like. The data thus generated is stored in the storage section 20 via the major control section 10.

The input control section 40 controls the input unit 41 that accepts the operation from the operator of the communication apparatus 1, and transmits the input signal in accordance with the operation entered by the operator to the major control section 10. The entered operation that is accepted at the input unit 41 encompass: selecting image data that the operator of the communication apparatus 1 desires to transmit; providing instructions for starting infrared communications with the communication apparatus 2, the like.

The photographing unit 51 photographs a subject such as a person or a landscape. This photographed image or video is transmitted to the photographing control section 50. The photographing unit 51 is made of a camera or the like, for example.

The photographing control section 50 converts the image or video photographed by the photographing unit 51 to digital data, and transmits this digital data to the major control section 11. The digital data thus transmitted is stored in the storage section 20.

The audio input unit 61 reads in a voice vocalized by the operator of the communication apparatus 1 as an audio signal, and transmits this audio signal to the audio control section 60. The audio input unit 61 is constructed of, for example, a microphone.

The audio output unit 62 converts an analog audio signal transmitted from the audio control section 60 to a sound, and outputs this sound. The audio output unit 62 is constructed of, for example, a speaker.

The audio control section 60 controls (i) the audio input unit 61 into which the voice of the operator of the communication apparatus 1 is inputted and (ii) the audio output unit 62 from which a sound is outputted to the operator of the communication apparatus 1. The audio control section 60 converts audio data transmitted from another communication apparatus to an analog audio signal, and outputs this analog audio signal to the audio output unit 62. In a case where audio data is transmitted from the message presenting section 103, this audio data is converted to an analog audio signal and is outputted to the audio output unit 62.

The external communications control section 70 is connected to the communications network 900, and controls communications between the communication apparatus 1 and an external communication apparatus not illustrated, via the communications network 900. Namely, the external communications control section 70 transmits various data that is transmitted from the external communication apparatus not illustrated to the major control section 10. Moreover, the external communications control section 70 transmits, to the external communication apparatus not illustrated, various data that is transmitted from the major control section 10 in accordance with instructions given from the major control section 10, via the communications network 900. The external communications control section 70 includes a communication section, for example an antenna.

The display control section 30, the display unit 31, the photographing control section 50, the photographing unit 51, the audio control section 60, the audio input unit 61, the audio output unit 62, and the external communications control section 70 are not always necessarily provided, and are selectively provided as appropriate depending on functions of the communication apparatus 1.

For example, in a case where the communication apparatus 1 is applied to a digital camera, the communication apparatus 1 can be arranged so as to include the photographing control section 50 and the photographing unit 51, for transmitting a photographed image to the communication apparatus 2 by the communications function operated by the major control section 10, the transmitting section 80, and the receiving section 81. Moreover, in a case where the communication apparatus 1 is applied to a mobile phone, the communication apparatus 1 can be arranged so as to include the audio control section 60, the audio input unit 61, the audio output unit 62, and the external communications control section 70, for transmitting received audio data and e-mail data to the communication apparatus 2 by the communications function operated the major control section 10, the transmitting section 80, and the receiving section 81.

The following description specifically describes the major control section 10.

The major control section 10 includes a LAP layer processing section 100, an upper layer processing section 101, a lower layer processing section 102. The major control section may also include the message presenting section 103.

The LAP layer processing section 100 includes a protocol control section 110, a timer 120, a transmit request command analyzing section 130, a outbound upper layer data recording section 140, a outbound frame generating section 150, a inbound frame analyzing section 160, a inbound upper layer data recording section 170, and a receive command message generating section 180.

The protocol control section 110 controls a protocol of a LAP layer. Thus, the protocol control section 110 includes an IrDA-LAP control section (first protocol control section) (first protocol control means) 111, an IrSimple-LAP control section (second protocol control section) (second protocol control means) 112, and a protocol switching section (protocol switching means) 113.

The IrDA-LAP control section 111 carries out communication based on the IrDA-LAP protocol. In order to do so, the IrDA-LAP control section 111 includes a station discovery control section 111a, a connection control section 111b, a data transfer control section 111c, and a disconnection control section 111d. The station discovery control section 111a carries out station discovery processing based on the IrDA-LAP protocol. The connection control section 111b carries out connection processing based on the IrDA-LAP protocol. The data transfer control section 111c carries out data transfer based on the IrDA-LAP protocol. The disconnection control section 111d carries out disconnection processing based on the IrDA-LAP protocol. In the IrDA-LAP control section 111, (i) at a time of connection establishment, the connection processing is carried out by the connection control section 111b provided that the station discovery processing has been carried out by the station discovery control section 111a, (ii) at a time of data transfer, the data transfer is carried out by the data transfer control section 111c, and (iii) at a time of disconnection, the disconnection processing is carried out by the disconnection control section 111d.

The IrSimple-LAP control section 112 carries out communication based on the IrSimple-LAP protocol. In order to do so, the IrSimple-LAP control section 112 includes a connection control section 112a, a data transfer control section 112b, and a disconnection control section 112c. The connection control section 112a carries out connection processing based on the IrSimple-LAP protocol. The data transfer control section 112b carries out data transfer based on the IrSimple-LAP protocol. The disconnection control section 112c carries out disconnection processing based on the IrSimple-LAP protocol. In the IrSimple-LAP control section 112, (i) at a time of connection establishment, connection processing is carried out by the connection control section 112a, (ii) at a time of data transfer, the data transfer is carried out by the data transfer control section 112b, and (iii) at a time of disconnection, the disconnection processing is carried out by the disconnection control section 112c.

The protocol switching section 113 causes the IrDA-LAP control section 111 and the IrSimple-LAP control section 112 to switch between each other. That is to say, when a connection is to be established with the communication apparatus 2, the communication apparatus 1 repeats the processings of, by the switching processing of the protocol switching section 113, first attempting establishment of a connection based on the IrDA protocol, next attempting establishment of a connection based on the IrSimple protocol, then again attempting the establishment of the connection based on the IrDA protocol.

More specifically, when a connection is established with the communication apparatus 2, the protocol switching section 113 first actuates the IrDA-LAP control section 111. This causes an XID command (IrDA station discovery command) to be transmitted. If no response is received from the communication apparatus 2 after the XID command has been transmitted, a XID-End command is transmitted so as to de-actuate the IrDA-LAP control section. Subsequently, the IrSimple-LAP control section 112 is actuated. This causes an SNRM command (connect request command) to be transmitted. If no response is received from the communication apparatus 2 after the SNRM command has been transmitted, the IrDA-Simple control section 112 is de-actuated. Thereafter, the IrDA-LAP control section 111 is actuated again. The protocol switching section 113 repetitively carries out the foregoing switching processings. Note that, when the communication becomes disconnected, the protocol switching section 113 switches the operation to the IrDA-LAP control section 111, and attempts to establish a connection based on the IrDA-protocol. Specific procedures are later described.

The message presenting section 103 presents a predetermined message before a connection between the communication apparatus 1 and the communication apparatus 2 is started, more specifically, before the protocol switching section 113 first causes the IrDA-LAP control section 111 to be actuated. The message is, for example, text data or audio data to be presented so as to urge the operator of the communication apparatus 1 to make another communication apparatus in a receptive state. Moreover, the message presenting section 103 presents the message to the operator by causing the display unit 31 to display the message via the display control section 30, or by causing the audio output unit 62 to output the message via the audio control section 60.

The timer 120 is a timer that is controlled by the protocol control section 110. The timer 120 is used, for example, for the protocol control section 110 to determine a timeout of the connection processing.

The transmit request command analyzing section 130 analyzes a transmit request command from a layer above (LMP layer). A transmit request command here denotes a connect request, a data transfer request, and a disconnect request. An analysis result thus produced is notified to the protocol control section 130.

The outbound upper layer data recording section 140 records transmitted data from the layer above (LMP layer). The data thus recorded is passed to the outbound frame generating section 150, and is arranged inside an outbound frame.

The outbound frame generating section 150 generates an outbound frame to be passed to a layer below (PHY layer), in accordance with the data acquired from the outbound upper layer data recording section 140. The outbound frame here is indicative of the SNRM command (connect request), a UI command (data transfer request), and a DISC command (disconnect request).

The inbound frame analyzing section 160 analyzes an inbound frame from the layer below (PHY layer), and notifies the protocol control section 110 of its analysis result. Moreover, the inbound frame analyzing section 160 records in the inbound upper layer data recording section 170 the upper layer data that is extracted while carrying out the analysis.

The inbound upper layer data recording section 170 records the upper layer data that is analyzed and extracted at the inbound frame analyzing section 160. The data thus stored is passed to the layer above (LMP layer).

The receive command message generating section 180 generates a receive command in accordance with a receive command message generation request sent from the protocol control section 110. This receive command is notified to the layer above (LMP layer). The receive command here is indicative of a connect request receive command, a data transfer request receive command, and a disconnect request receive command.

The upper layer processing section 101 carries out processing in a layer above the LAP layer, based on data received from the inbound upper layer data recording section 170 and the receive command received from the receive command message generating section 180.

The lower layer processing section 102 carries out processing in a layer below the LAP layer, based on data received from the transmitting upper layer data storing section 140 and the outbound frame of the outbound frame generating section 150.

Figure 3:
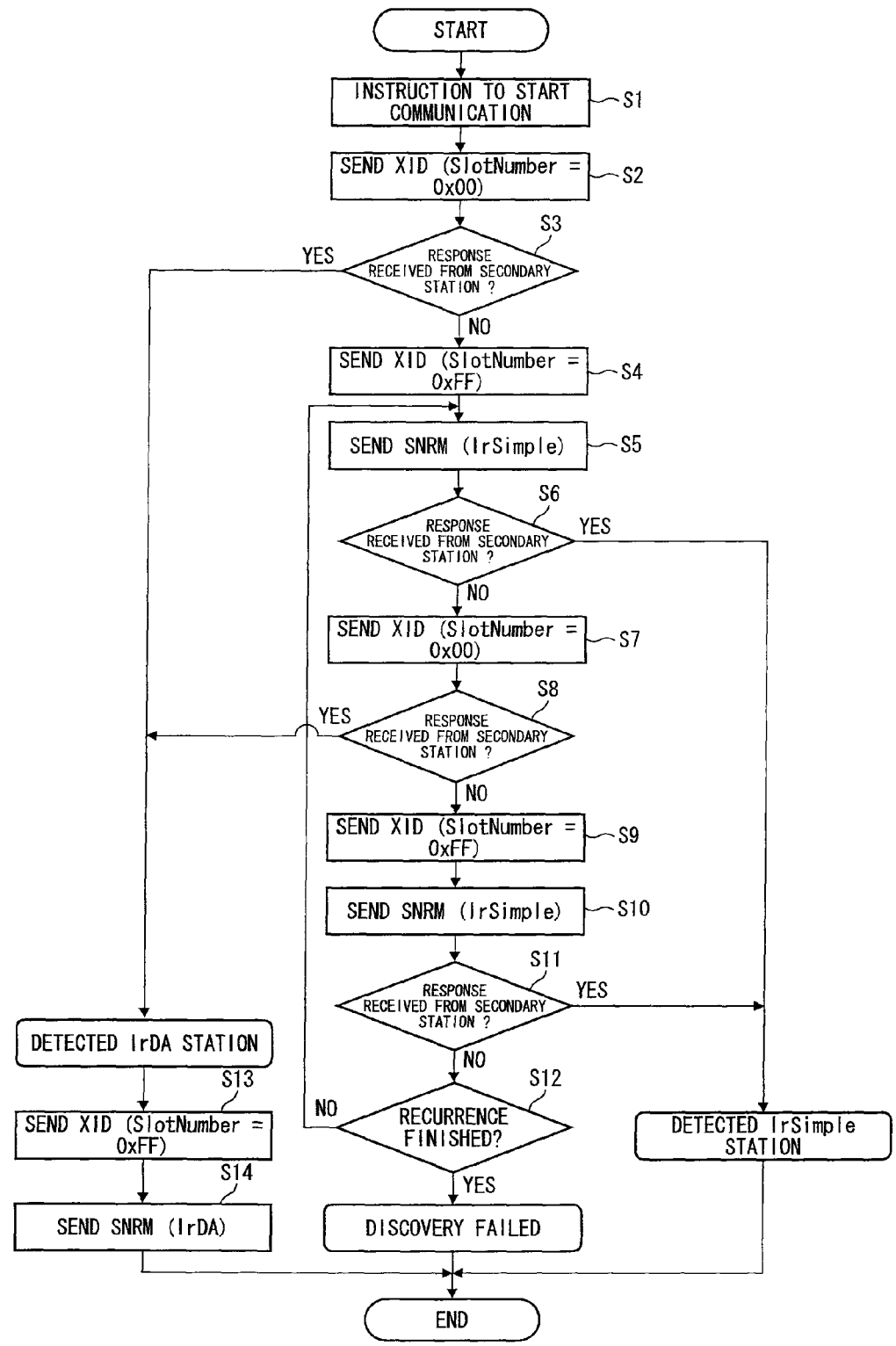
FIG. 3 is a flow chart showing a connection routine of a communication apparatus that is one embodiment of the present invention with another communication apparatus.

The following description explains a routine for connecting the communication apparatus 1 that serves as a primary station and the communication apparatus 2 that serves as a secondary station, with reference to FIG. 3 is a flow chart showing a routine for repetitively transmitting a connect request command in accordance with whether or not a response is received from the secondary station by the communication apparatus 1.

When an operator of the communication apparatus 1 enters, from the input unit 41, an instruction to start infrared communications (S1), the protocol switching section 113 first actuates the IrDA-LAP control section 111. A 1-slot XID command is transmitted from the station discovery control section 111a with which to confirm whether or not another communication apparatus which supports the IrDA protocol is present in a communications range of the communication apparatus 1 (S2 (first protocol control step)). In a case where a communication apparatus 2 supports the IrDA protocol and is present in the communications range of the communication apparatus 1, the communication apparatus 2, as a secondary station, returns an XID response to the XID command. In a case where the communication apparatus 2 strictly adheres to both the IrDA and IrSimple protocol specifics, the communication apparatus 2 does not respond to the first 1-slot XID command, as described above.

Thereafter, the station discovery control section 111a checks whether or not a response from the communication apparatus 2 is received. If the response is received (YES in S3), the connection control section 111b of the IrDA-LAP control section 111 carries out a connection based on the IrDA protocol (S13 to S14). On the other hand, if no response is received (NO in S3), the station discovery control section 111a sends a XID-End command specified in the IrDA protocol (S4 (first protocol control step)), and notifies to other communication apparatus in the communications range, of the termination of the station discovery command.

Next, the protocol switching section 113 actuates the IrSimple-LAP control section 112 in replacement of the IrDA-LAP control section 111. This causes the connection control section 112a to transmit an SNRM command of the IrSimple protocol (S5 (second protocol control step)). In a case where the communication apparatus 2 supports the IrSimple protocol and is present in a communications range of the communication apparatus 1, the communication apparatus 2 as the secondary station returns a UA response, in response to the SNRM command. Even with the case of the communication apparatus 2 which strictly adheres to both the IrDA and IrSimple protocol specifics, the UA response is similarly returned.

Thereafter, the connection control section 112a checks whether or not a response from the communication apparatus 2 is received. Reception of the response (YES in S6) indicates that a communication apparatus which supports the IrSimple protocol has been discovered as the secondary station. This completes establishment of connections in the LAP, LMP, SMP, and OBEX layers, whereby the connections allows transmission of data stored in the storage section 20 based on the IrSimple protocol. On the other hand, if no response is received from the communication apparatus 2 (NO in S6), the protocol switching section 113 actuates the IrDA-LAP control 111 in replacement of the IrSimple-LAP control section 112, so as to cause the station discovery control section 111a to transmit, as similar to the step S2, the 1-slot XID command (S7 (first protocol control step)).

Subsequently, as similar to the step S3, the station discovery control section 111a checks whether or not a response is received from the communication apparatus 2. If the response is received (YES in S8), the IrDA-LAP control section 111 establishes a connection based on the IrDA protocol (S13 to S14). If no response is received (NO in S8), the station discovery control section 111a transmits the XID-End command specified in the IrDA protocol (S9 (first protocol control step)), and notifies other communication apparatus in the communications range of the communication apparatus 1 that the station discovery command is terminated.

Subsequently, as similar to the step S5, the protocol switching section 113 actuates the IrSimple-LAP control section in replacement of the IrDA-LAP control section 111. This causes the connection control section 112a to send the SNRM command of the IrSimple protocol (S10 (second protocol control step)).

Thereafter, the connection control section 112a checks whether or not a response from the secondary station is received. Reception of a response (YES in S11) indicates that the communication apparatus 2 that supports the IrSimple protocol has been discovered as the secondary station. This completes establishment of connections in the LAP, LMP, SMP, and OBEX layers, whereby the connections allow transmission of data stored in the storage section 20 based on the IrSimple protocol. On the other hand, if no response is received from the communication apparatus 2 (NO in S8), the protocol switching section 113 judges whether or not the steps S5 to S10 have completed its repetition (S12). If the repetition has been completed (YES in S12), the connection processing is terminated even though no secondary station is discovered. Judgment of whether the repetition of the steps have been completed or not may be judged due to the specified number of repeated times, or may be judged by measuring, by use of the timer 120, an elapse of time since the start of the connection procedure (for example, repeating the steps for just 5 seconds after the start of connection). On the other hand, if the repetition is not yet expired (NO in S12), the protocol switching section 113 actuates the IrSimple-LAP control section 112, which causes the connection control section 112a to transmit the SNRM command of the IrSimple protocol (S5).

Moreover, the communication apparatus 2 responding to the station discovery command of the IrDA protocol (YES in S3 or S8) indicates that the communication apparatus 1 has discovered the communication apparatus 2 that supports the IrDA protocol. Thus, the station discovery control section 111a transmits the XID-End command, so as to notify to the other communication apparatus in a communications range of the communication apparatus 1 that the station discovery command is terminated (S13 (first protocol control step)). Subsequently, the connection control section 111b transmits an SNRM command which carries out connection in the LAP layer specified in the IrDA protocol (S14). Further, although not illustrated, once the connection of the LAP layer is established, the upper layer processing section 101 executes establishment of connection in the LMP layer, the TinyTP layer, and the OBEX layer. The establishment of the connections in each of the layers allows the communication apparatus 1 to transmit data stored in the storage section 20 to the communication apparatus 2, based on the IrDA protocol.

The following description explains, with reference to the flow chart shown in FIG. 3, connection routines between the communication apparatus 1 and the communication apparatus 2, for cases where the communication apparatus 2 serving as the secondary station (1) is a illegal response sender device which supports the IrDA protocol however returns a UA response to a broadcast packet, (2) strictly adheres to just the IrDA protocol specifics, (3) strictly adheres to just the IrSimple protocol specifics, and (4) strictly adheres to both the IrDA and IrSimple protocol specifics.

(1) In a Case of the Illegal Response Sender Device

In this case, the communication apparatus 2 returns an XID response so as to respond to the 1-slot XID command transmitted by the station discovery control section 111a (S2). Since the communication apparatus 1 has received a response from the communication apparatus 2 (YES in S3), the IrDA-LAP control section 111 carries out connection establishment based on the IrDA protocol (S13 and S14). Progression of the processing as such allows carrying out communication based on the IrDA protocol without the communication apparatus 1 transmitting the SNRM packet of the IrSimple protocol.

(2) In the Case where Just the IrDA Protocol Specifics is Strictly Adhered to

In this case, the communication apparatus 2 returns an XID response so as to respond to the 1-slot XID command transmitted by the station discovery control section 111a (S2). Since the communication apparatus 1 has received a response from the communication apparatus 2 (YES in S3), the IrDA-LAP control section 111 carries out connection establishment based on the IrDA protocol (S13 and S14), in the communication apparatus 1. Progression of the processing as above allows carrying out communication between the communication apparatus 1 and the communication apparatus 2 based on the IrDA protocol.

(3) In the Case where Just the IrSimple Protocol Specifics is Strictly Adhered to In this case, the communication apparatus 2 does not respond to the 1-slot XID command transmitted by the station discovery control section 111a (S2). This is because the communication apparatus 2 cannot recognize the 1-slot XID command. Since the communication apparatus 1 receives no response from the communication apparatus 2 (NO in S3), the station discovery control section 111a transmits the XID-End command (S4), and the protocol switching section 113 actuates the IrSimple-LAP control section 112 in replacement of the IrDA-LAP control section 111. This causes the connection control section 112a to transmit the SNRM command of the IrSimple protocol (S5). In response to this, the communication apparatus 2 returns a UA response to the SNRM command of the IrSimple protocol transmitted by the connection control section 112a. The communication apparatus 1 receives a response from the communication apparatus 2 (YES in S6); thus, the connection is established. Progression of the procedures as above allows the communication apparatus 1 to communicate with the communication apparatus 2 based on the IrSimple protocol.

(4) In the Case where Both the IrDA and IrSimple Protocol Specifics are Strictly Adhered to In this case, the communication apparatus 2 does not respond to the 1-slot XID command transmitted by the station discovery control section 111a. Since the communication apparatus 1 receives no response from the communication apparatus 2 (NO in S3), the station discovery control section 111a transmits the XID-End command (S4), and the protocol switching section 113 actuates the IrSimple-LAP control section 112 in replacement of the IrDA-LAP control section 111. This causes the connection control section 112a to transmit the SNRM command of the IrSimple protocol (S5). In response to this, the communication apparatus 2 returns a UA response to the SNRM command of the IrSimple protocol transmitted by the connection control section 112a. The communication apparatus 1 receives a response from the communication apparatus 2 (YES in S6); thus, the connection is established. Progression of the procedures as above allows the communication apparatus 1 to communicate with the communication apparatus 2 based on the IrSimple protocol. Note that, even in a case where the communication apparatus 2 strictly adheres to the above communication apparatus 1, that is, both the IrDA and IrSimple protocol specifics, and meanwhile connection is attempted from the IrDA connection at the time of connection establishment, it is possible to carry out communication based on the IrSimple protocol between the communication apparatus 1 and the communication apparatus 2, by following the routine as similar to the above.

Figure 4:
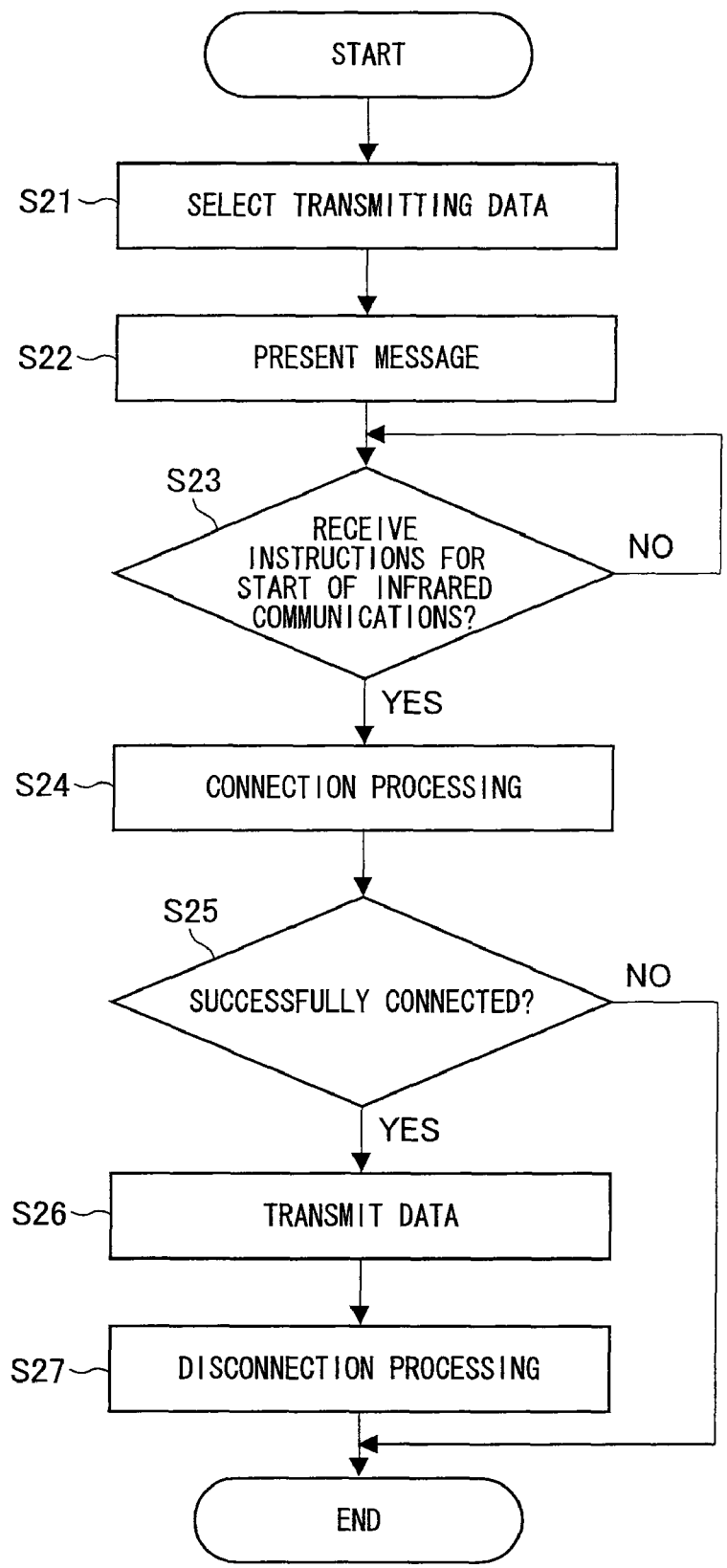
FIG. 4 is a flow chart showing a routine in a case where a predetermined message is presented when a communication apparatus which is one embodiment of the present invention is to be connected to another communication apparatus.

The following description explains, with reference to FIG. 4, a connection routine in a case where a message is to be displayed via the message presenting section 103 in the communication apparatus 1. FIG. 4 is a flow chart showing a routine of the message presenting section 103 which presents a predetermined message until an operator of the communication apparatus 1 gives an instruction to start the infrared communications.

Figure 5:
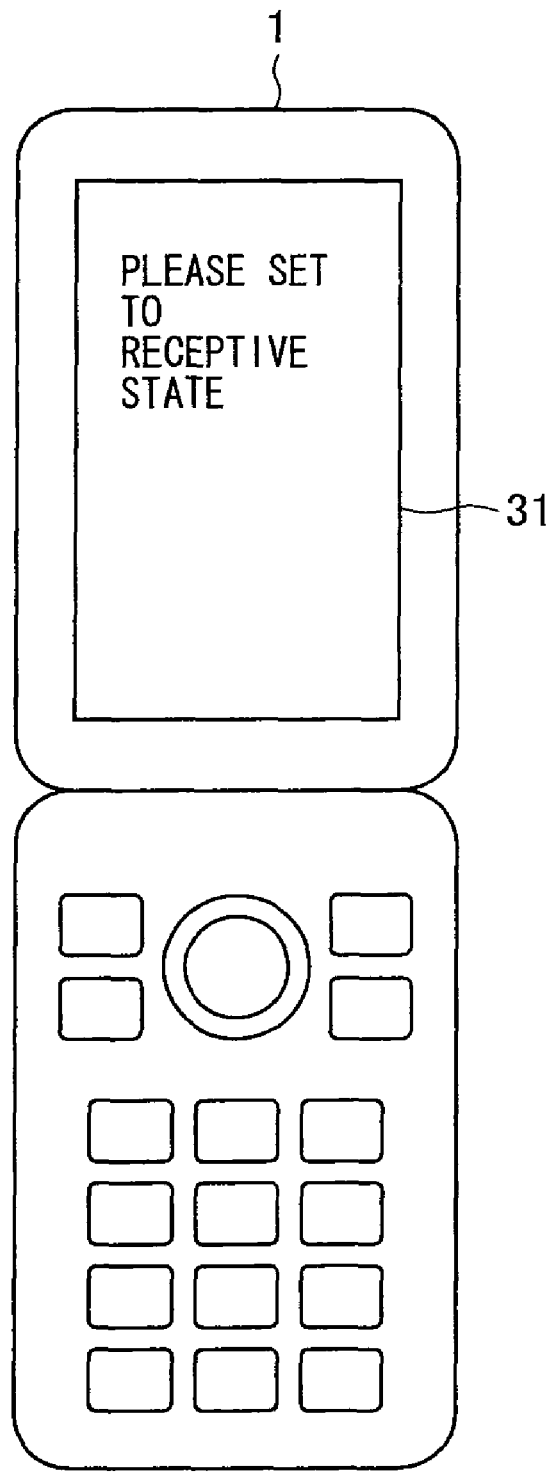
FIG. 5 is a view illustrating an example of a presented message, on the communication apparatus illustrated in FIG. 1.
Figure 6:
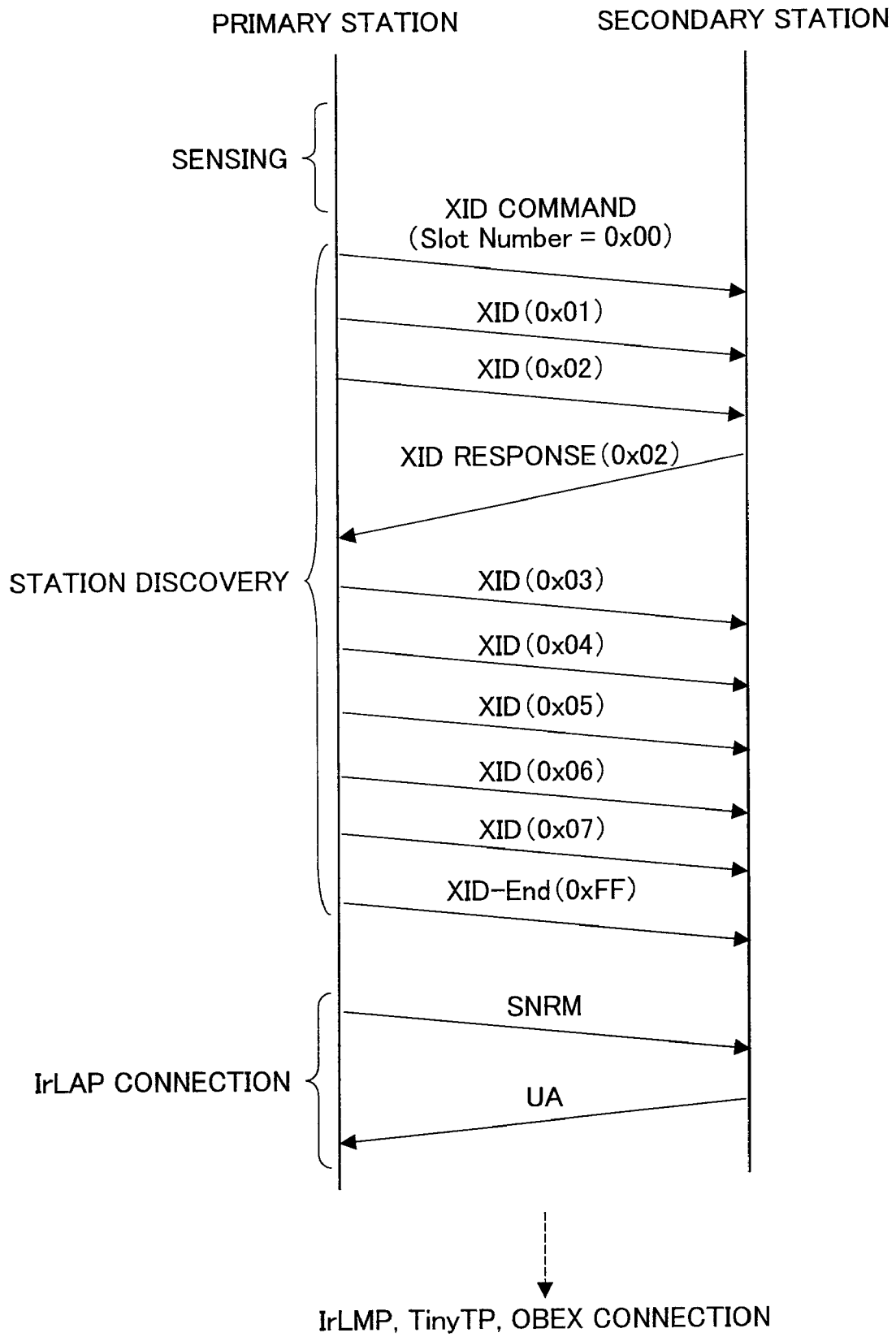
FIG. 6 is a view showing a signal sequence followed when connection of an LAP layer specified by IrDA standards is established.
Figure 7:
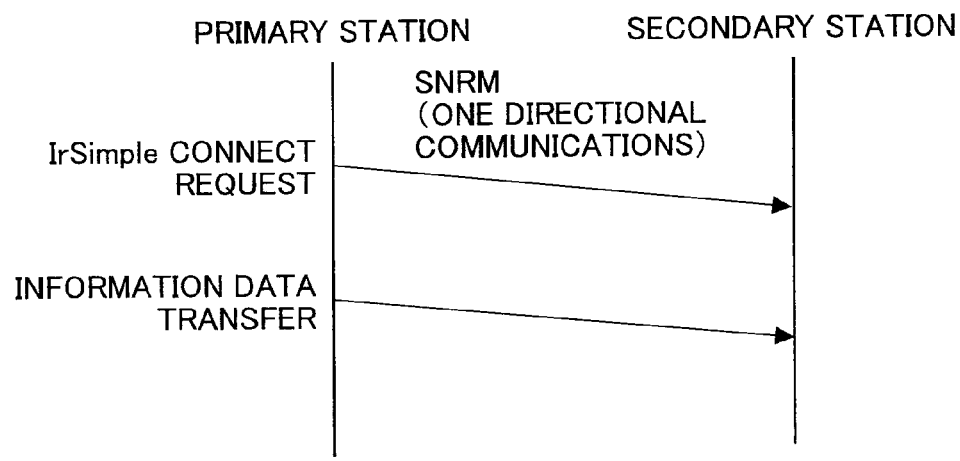
FIG. 7 is a view showing a signal sequence followed when connection of an LAP layer is to be established in an IrSimple-compliant unidirectional communication.
Figure 8:
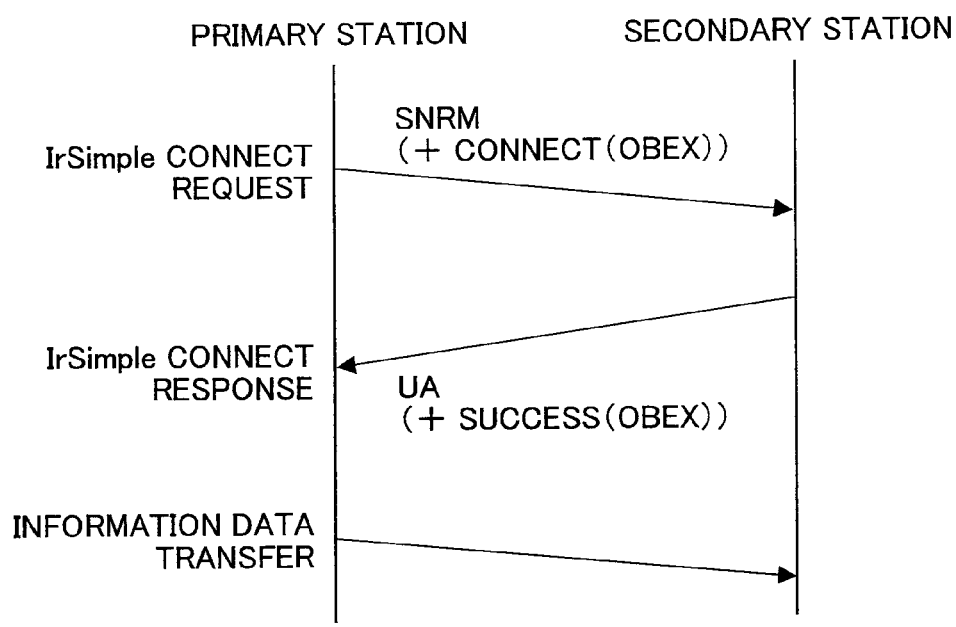
FIG. 8 is a view showing a signal sequence followed when connection of an LAP layer is to be established in an IrSimple-compliant bidirectional communication.
Figure 11:
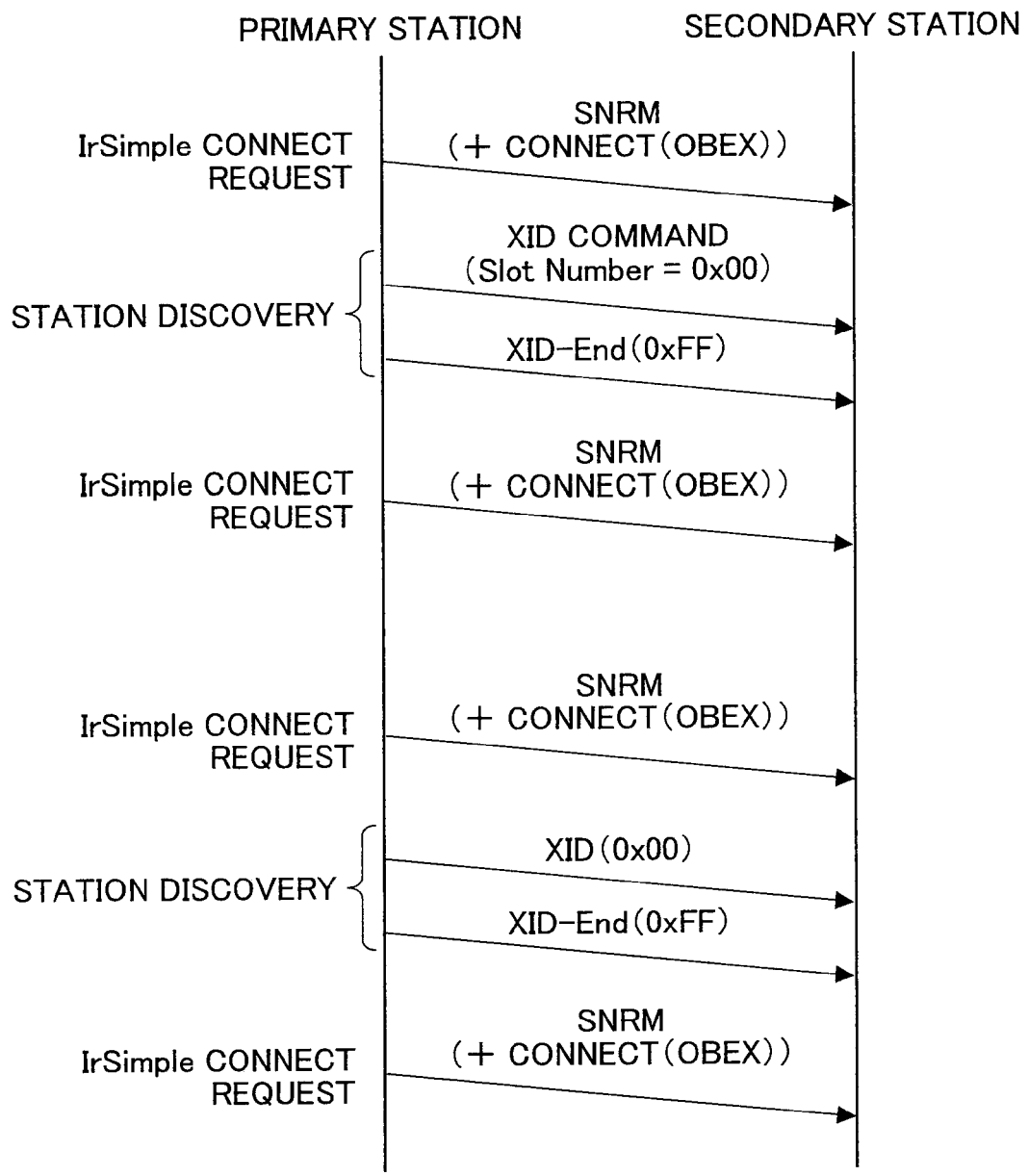
FIG. 11 is a view showing a signal sequence followed when a communication apparatus which strictly adheres to both the IrDA and IrSimple protocol specifics switches between an IrSimple protocol and an IrDA protocol.
Figure 13:
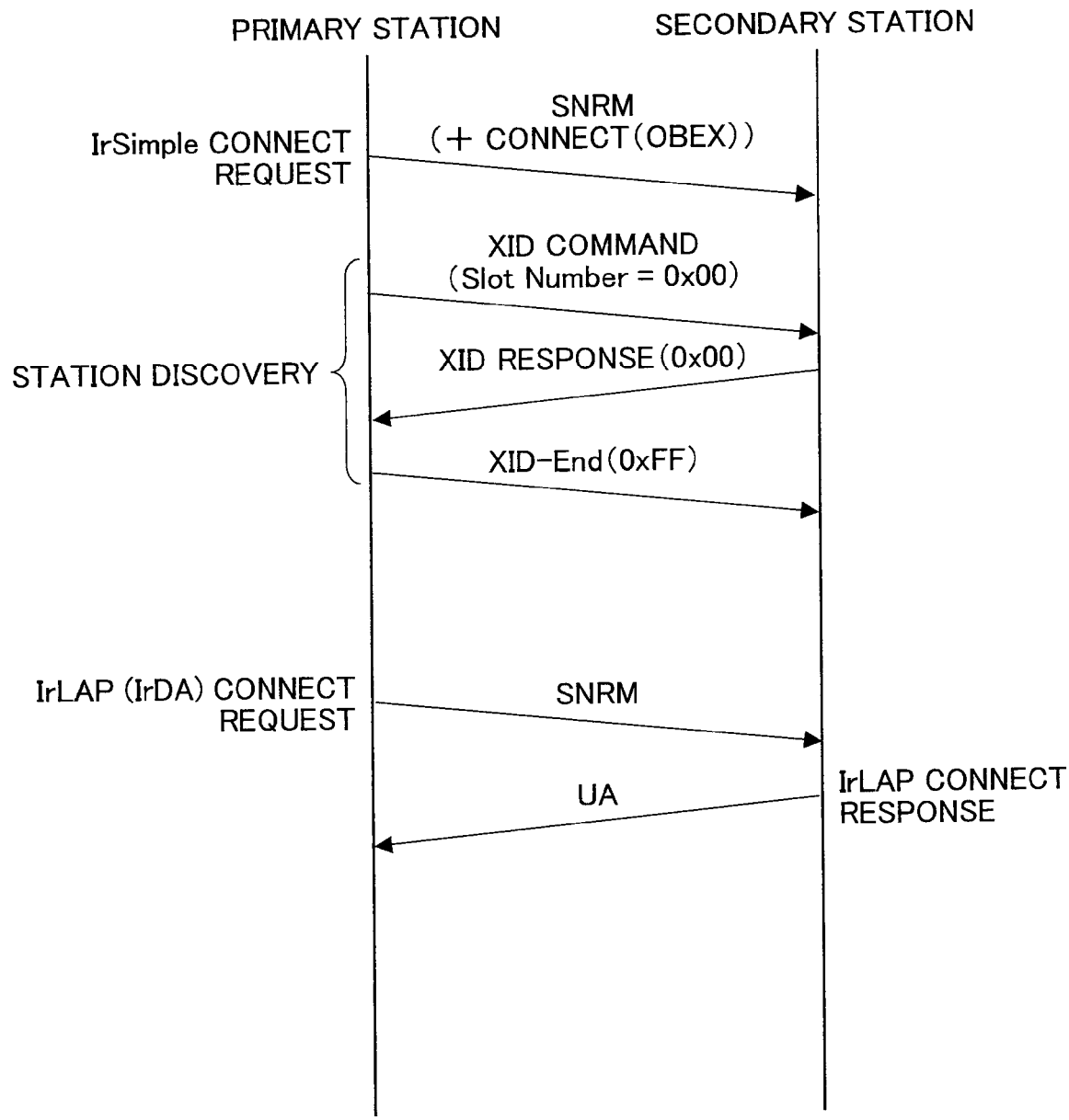
FIG. 13 is a view showing a signal sequence followed when a connection between (i) a communication apparatus which strictly adheres to both the IrDA and IrSimple protocol specifics and (ii) a communication apparatus serving as a secondary station which strictly adheres to just the IrDA protocol specifics is to be established.
Figure 17:
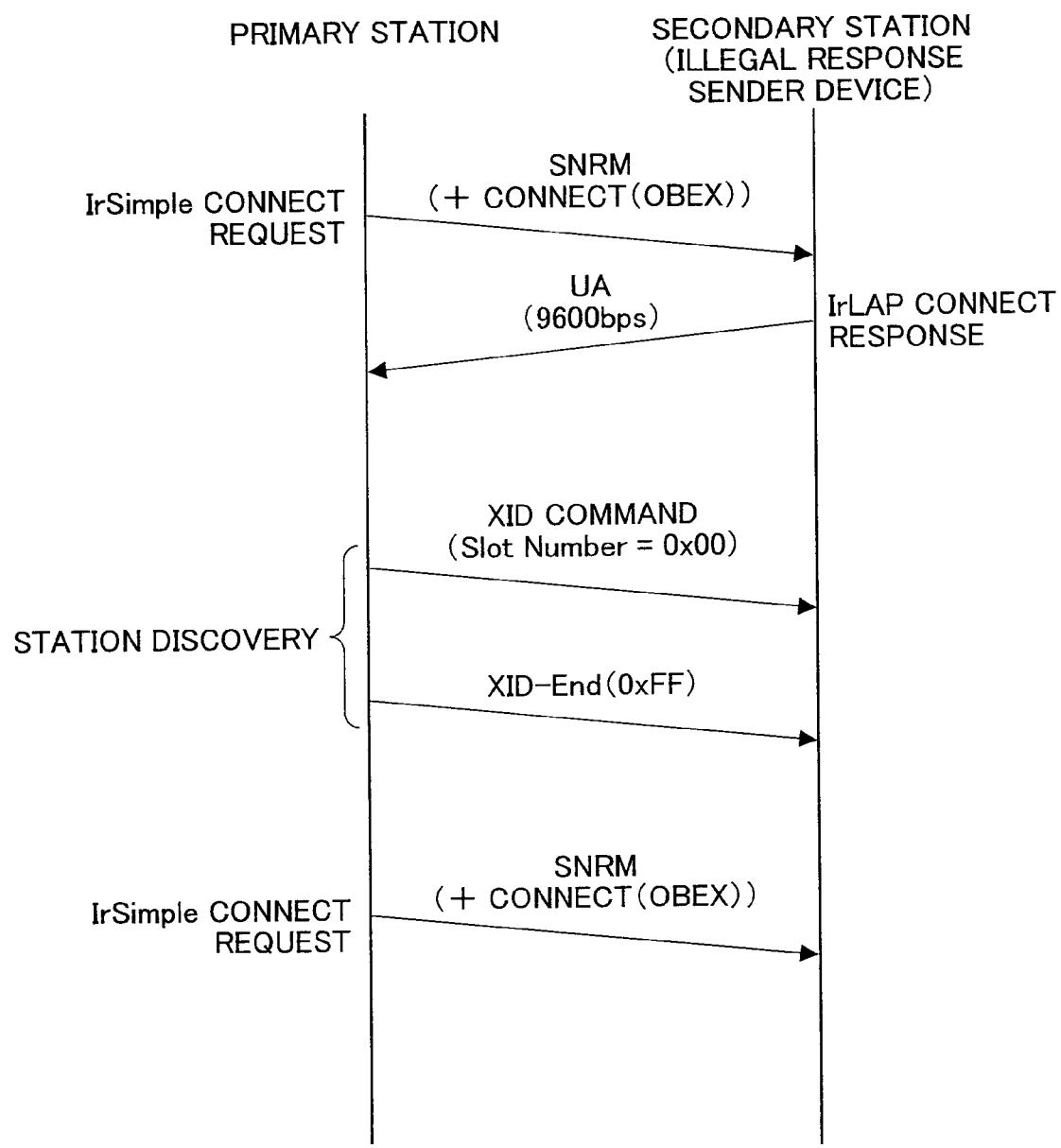
FIG. 17 is a view showing a signal sequence in which a communication apparatus that strictly adheres to both the IrDA and IrSimple protocol specifics attempts, as a primary station, establishment of a connection with a communication apparatus that returns a UA response to an IrSimple SNRM command.

When an operator of the communication apparatus 1 selects, via the input unit 41, image data of which the operator desires to transmit to another communication apparatus (S21), which image data is selected from, for example, image data displayed on the display unit 31, the message presenting section 103 presents, for example on the display unit 31 as illustrated in FIG. 5, a predetermined message stored in the storage section 21 (S22). This display urges the operator of the communication apparatus 1 to make the communication apparatus 2 in a receptive state. By having the operator make the communication apparatus in the receptive state in accordance with the message, the communication apparatus 2 can receive the first XID command transmitted from the communication apparatus 1 without fail in the step S2 in FIG. 3. Thus, the communication apparatus assuredly responds to the XID command.

Subsequently, the protocol switching section 113 standbys for connection start processing (S23) until the operator of the communication apparatus 1 enters an instruction for starting infrared communications from the input unit 51. Once the operator enters the instruction for starting infrared communications, the protocol control section 110 carries out connection processing with the communication apparatus 2 by following the connection procedures explained in the steps S2 through S14 in FIG. 3 (S24).

If the connection is successfully established (YES in S25), communication is carried out based on a protocol in which the upper layer processing section 101, the LAP layer processing section 100, and the lower layer processing section 102 are connected (S26).

Upon termination of the communication, disconnection processing is carried out based on the protocol in which the upper layer processing section 101, the LAP layer processing section 100, and the lower layer processing section 102 are connected (S27). This completes the communication.

As long as the communication apparatus is capable of infrared communications, a communication apparatus according to the present invention and a communication apparatus which serves as the secondary station may be, for example, a mobile phone, a PDA (Personal Digital Assistant), a PC, a television, a digital camera, or a printer.

For example, a communication apparatus according to the present invention is suitable for a mobile phone which transmits, to a secondary station via infrared communications, data such as e-mail data and image data received from another mobile phone via a mobile phone network. Moreover, for example, the communication apparatus according to the present invention is suitable for a photographing apparatus such as a digital camera, which transmits photographed image data to a secondary station with infrared light. The data of which the communication apparatus according to the present invention transmits and receives, may be text data, audio data, image data, video data, or a combination thereof, and is not limited to a particular format.

The foregoing embodiment explains a mode of the communication apparatus 1 that operates as a primary station. However, the communication apparatus 1 may also have a function for operating as a secondary station.

The present invention may also be expressed as follows.

[1] A communication apparatus according to the present invention is a communication apparatus for carrying out communication with infrared light, the communication apparatus including: station discovery packet transmitting means for searching for an opposite apparatus which processes a first protocol that requires station discovery; first connection packet transmitting means for carrying out connection based on the first protocol; second connection packet transmitting means for carrying out a connection based on a second protocol that does not require station discovery; receiving means; and transmission instructing means, the station discovery packet transmitting means transmitting a station discovery packet upon instruction of transmission via the transmission instructing means, a first protocol connection packet being transmitted when a response to the station discovery packet transmitted by the station discovery packet means is received from another communication apparatus, and a second protocol connection packet being transmitted in a case where a response to the station discovery packet is not received from another communication apparatus.

[2] Further, a communication apparatus according to the present invention may be the apparatus as recited in [1], wherein the first protocol is an IrDA protocol, and the second protocol is an IrSimple protocol.

[3] Further, a communication apparatus according to the present invention may be the apparatus as recited in [1], including message presenting means, the communication apparatus presenting a message for urging an opposite apparatus to be made in a receptive state, before the station discovery packet is transmitted.

[4] A communication method according to the present invention may be a communication method for communicating with infrared light, the method including the steps of: a station discovery packet transmitting step of searching for an opposite apparatus which processes a first protocol that requires station discovery; a first connection packet transmitting step of carrying out connection based on the first protocol; a second connection packet transmitting step of carrying out a connection based on a second protocol that does not require station discovery; receiving step means; and a transmission instructing step, the station discovery packet transmitting step transmitting a station discovery packet upon instruction of transmission via the transmission instructing means, a first protocol connection packet being transmitted when a response to the station discovery packet transmitted in the station discovery packet step is received from another communication apparatus, and a second protocol connection packet being transmitted in a case where a response to the station discovery packet is not received from another communication apparatus.

Finally, the major control section 10 may be realized by way of hardware or software as executed by a CPU as follows. In a case of realizing by way of software, the communication apparatus 1 each include a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to the communication apparatus 1 a computer-readable storage medium containing control program code (executable program, intermediate code program, or source program) for the communication apparatus 1, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a Floppy® disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The communication apparatus 1 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth®, 802.11 wireless, HDR, mobile telephone network, satellite line, or terrestrial digital network. The present invention encompasses a carrier wave or data signal transmission in which the program code is embodied electronically.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

As described above, a communication apparatus in accordance with the present invention serves as a primary station for communicating with a secondary station, the communication apparatus including: first protocol control means for transmitting (i) a station discovery command with which to confirm a presence of the secondary station, and (ii) a first connect request command, after the station discovery command is transmitted and when a response to the station discovery command is received, so as to carry out connection processing; second protocol control means for transmitting a second connect request command so as to carry out a connection processing, without transmitting a station discovery command for confirming a presence of the secondary station; and protocol switching means for causing the second protocol control means to transmit the second connect request command, in a case where a response to the station discovery command has not been received after an elapse of a predetermined time since the station discovery command was transmitted before transmission of the second connect request command.

Moreover, a communication method in accordance with the present invention includes the steps of: (a) transmitting (i) a station discovery command with which to confirm a presence of the secondary station, and (ii) a first connect request command, after the station discovery command is transmitted and when a response the station discovery command is received, so as to carry out connection processing; (b) transmitting a second connect request command so as to carry out connection processing, without transmitting a station discovery command for confirming a presence of the secondary station; and (c) causing the second connect request command to be transmitted in the step (b), in a case where a response to the station discovery command has not been received after an elapse of a predetermined time since the station discovery command was transmitted before transmission of the second connect request command.

According to the arrangement, a primary station attempts establishment of a connection by switching between a first protocol station discovery command and a second connect request command, so that a connection can be established with a secondary station regardless of whether the secondary station supports the first protocol or the second protocol. Furthermore, the primary station initially transmits the station discovery command. Thus, in a case where the secondary station strictly adheres to just the first protocol specifics, the secondary station returns a response to the station discovery command. In a case where the secondary station strictly adheres to (a) just the second protocol specifics or (b) the first and second protocol specifics however prioritizing the second protocol specifics, even if the primary station initially transmits the station discovery command, the secondary station does not respond to this station discovery command. This allows the secondary station to return a response to a subsequently transmitted second connect request command. Furthermore, even in the case where the secondary station is an illegal response sender device which returns a response based on the first protocol when the second connect request command is received, the primary station initially transmits the station discovery command; thus, the secondary station can return a response to the station discovery command.

Hence, in any of the cases where the secondary station (i) strictly adheres to the first protocol specifics, (ii) strictly adheres to the second protocol specifics, (iii) strictly adheres to both the first and second protocol specifics however prioritizing the second protocol specifics, and (iv) is a illegal response sender device; the secondary station assuredly returns a response to the primary station, since the primary station initially transmits the station discovery command and not the second connect request command, when establishing connection between the primary station and any one of the foregoing secondary stations.

As such, the primary station can be assuredly connected to the secondary station. Particularly, the communication apparatus or the communication method assures connection with an illegal response sender device based on the first protocol.

Further, the communication apparatus in accordance with the present invention may further include, in the above arrangement, message presenting means for presenting a predetermined message for urging the secondary station to be made in a receptive state before the protocol switching means causes the first protocol control means to transmit the station discovery command.

According to the arrangement, furthermore, a predetermined message is presented so as to urge the operator to make the secondary station in a receptive state, before the communication apparatus initially transmits the station discovery command.

By thus having the operator make the secondary station in a receptive state in advance, in accordance with the message thus presented, it is possible to prevent the secondary station from failing to receive the station discovery demand that is initially transmitted from the primary station. Hence, it is possible to assuredly return a response to the initially transmitted station discovery command. Particularly, in the case where the secondary station is the illegal response sender device, fail of the secondary station to receive the initially transmitted station discovery command causes the secondary station to missend a response to the second connect request command that is subsequently received. This can be prevented by having the operator make the illegal response sender device to be in a receptive state, in accordance with a message thus presented. Hence, a response to the initially transmitted station discovery command is assuredly returned.

Since the secondary station assuredly transmits a response to the station discovery command, the communication apparatus can be assuredly connected to the secondary station. Particularly, the communication apparatus can be assuredly connected to an illegal response sender device based on the first protocol.

Furthermore, the communication apparatus according to the present invention may be arranged in the above arrangement such that the first protocol is an IrDA protocol, and the second protocol is an IrSimple protocol.

According to the arrangement, furthermore, the communication apparatus attempts establishment of a connection by switching between an XID command which is a station discovery command of an IrDA protocol and an SNRM command which is a connect request command of an IrSimple protocol, so that a connection can be established with a secondary station regardless of whether the secondary station supports the IrDA protocol or the IrSimple protocol. Furthermore, the communication apparatus initially transmits the XID command. Thus, in a case where the secondary station strictly adheres to just the IrDA protocol specifics, the secondary station returns a response to the XID command. In a case where the secondary station strictly adheres to (a) just the IrSimple protocol specifics or (b) the IrDA and IrSimple protocol specifics, even if the communication apparatus initially transmits the XID command, the secondary station does not respond to this XID command. This allows the secondary station to return a response to a subsequently transmitted SNRM command. Furthermore, even in the case where the secondary station is an illegal response sender device which returns a response of the IrDA protocol when the SNRM command is initially received, the communication apparatus initially transmits the XID command; thus, the secondary station can return a response to the XID command.

Hence, in any of the cases where the secondary station (i) strictly adheres to the IrDA protocol specifics, (ii) strictly adhere sot the IrSimple protocol specifics, (iii) strictly adheres to the IrDA and IrSimple protocol specifics however prioritizing the IrSimple protocol specifics, and (iv) is an illegal response sender device, the secondary station assuredly returns a response to the communication apparatus, since the protocol switching means causes the first protocol control means to initially transmit the XID command which is the station discovery command of the IrDA, and the protocol switching means does not cause the second protocol control means to initially transmit the SNRM command, at the time when connection between the communication apparatus and any one of the foregoing secondary stations is to be established.

As such, the communication apparatus can be assuredly connected to the secondary station. Particularly, the communication apparatus assuredly connects with an illegal response sender device based on the IrDA protocol.

Furthermore, a mobile phone according to the present invention includes the communication apparatus, the mobile phone causing the communication apparatus to transmit data received from an external communication apparatus connected via a communications network.

Thus, the mobile phone assuredly transmits, to a secondary station, particularly an illegal response sender device, data received from an external mobile phone connected via a communications network.

The communication apparatus may be realized by a computer. In this case, a control program of the communication apparatus which causes the computer to function as means of the communication apparatus, and a computer-readable recording medium in which the program is recorded are also included in the scope of the present invention.

Moreover, the communication apparatus may be realized by a communication circuit which functions as each of the above means.

The communication apparatus in accordance with the present invention which serves as a primary station for communicating with a secondary station is arranged such that the communication apparatus is switchable between a first protocol and a second protocol at a time when communication connection is to be established with the secondary station, the first protocol causing transmission of (i) a station discovery command with which to confirm a presence of the secondary station, and (ii) a first connect request command, after the station discovery command is transmitted and when a response the station discovery command is received, for carrying out data communication based on the first protocol so as to carry out connection processing, and the second protocol causing transmission of a second connect request command for carrying out data communication based on the second protocol, the station discovery command is transmitted before the second connect request command is transmitted, and in a case where a response to the station discovery command is received, a first connect request command is transmitted, the second connect request command is transmitted in a case where the response to the station discovery command has not been received after an elapse of a predetermined time since the station discovery command was transmitted.

According to the arrangement, the primary station is switchable between a station discovery command of the first protocol and a second connect request command of the second protocol. Further, the primary station transmits the station discovery command before the second connect request command is transmitted, regardless of whether the secondary station strictly adheres to the first or second protocol specifics. Thus, in a case where the secondary station strictly adheres to just the first protocol specifics, it is possible for the secondary station to return a response to the station discovery command. In a case where the secondary station strictly adheres to (a) just the second protocol specifics or (b) the first and second protocol specifics however prioritizing the second protocol specifics, the secondary station does not respond to the station discovery command, however can return a response to the second connect request command that is subsequently transmitted. Furthermore, even in the case where the secondary station is an illegal response sender device which returns a response of the first protocol when the second connect request command is received, the secondary station can return a response to the station discovery command, since the primary station transmits the station discovery command before the second connect request command is transmitted.

Hence, in any of the cases where the secondary station (i) strictly adheres to the first protocol specifics, (ii) strictly adheres to the second protocol specifics, (iii) strictly adheres to both the first and second protocol specifics however prioritizing the second protocol specifics, and (iv) is an illegal response sender device, the secondary station assuredly returns a response to the primary station since the primary station transmits the station discovery command before the second connect request command is transmitted, at a time when connection between the primary station and any one of the foregoing secondary stations is to be established.

As such, the primary station can be assuredly connected to the secondary station. Particularly, the communication apparatus or the communication method assures connection with an illegal response sender device based on the first protocol.

Moreover, a communication apparatus according to the present invention is a communication apparatus which serves as a primary station for communicating with a secondary station, the communication apparatus including: first protocol means for transmitting, at a time when establishing communication connection with the secondary station, (i) a station discovery command with which to confirm a presence of the secondary station, and (ii) a first connect request command, after the station discovery command is transmitted and when a response from the secondary station to the station discovery command is received, so as to carry out connection processing; second protocol control means for transmitting, at a time when communication connection is to be established with the secondary station, a second connect request command so as to carry out connection processing, without transmitting a station discovery command for confirming a presence of the secondary station; and protocol switching means for causing, at a time when communication connection is to be established with the secondary station, the first protocol control means to initially transmit the station discovery command, and in a case where a response to the station discovery command has not been received after an elapse of a predetermined time since the station discovery command was transmitted, causing the second protocol control means to transmit the second connect request command.

Moreover, a communication method according to the present invention includes the steps of: (a) transmitting, at a time when communication connection is to be established with the secondary station, (i) a station discovery command with which to confirm a presence of the secondary station, and (ii) a first connect request command, after the station discovery command is transmitted and when a response to the station discovery command is received, so as to carry out connection processing; (b) transmitting, at a time when communication connection is to be established with the secondary station, a second connect request command so as to carry out connection processing, without transmitting a station discovery command for confirming a presence of the secondary station; and (c) causing, at a time when communication connection is to be established with the secondary station, the station discovery command to be transmitted in the step (a), and in a case where a response to the station discovery command has not been received after an elapse of a predetermined time since the station discovery command was transmitted, causing the second connect request command to be transmitted in the step (b).

According to the arrangement, a primary station attempts establishment of a connection by switching between a first protocol station discovery command and a second protocol station discovery command, so that a connection can be established with a secondary station regardless of whether the secondary station supports the first protocol or the second protocol. Furthermore, the primary station initially transmits the station discovery command. Thus, in a case where the secondary station strictly adheres to just the first protocol specifics, the secondary station returns a response to the station discovery command. In a case where the secondary station strictly adheres to (a) just the second protocol specifics or (b) the first protocol second protocol specifics however prioritizing the second protocol specifics, even if the primary station initially transmits the station discovery command, the secondary station does not respond to this station discovery command. This allows the secondary station to return a response to a subsequently transmitted second connect request command. Furthermore, even in the case where the secondary station is an illegal response sender device which returns a response based on the first protocol when the second connect request command is received, the primary station initially transmits the station discovery command; thus, the secondary station can return a response to the station discovery command.

Hence, in any of the cases where the secondary station (i) strictly adheres to the first protocol specifics, (ii) strictly adheres to the second protocol specifics, (iii) strictly adheres to both the first and second protocol specifics however prioritizing the second protocol specifics, and (iv) is an illegal response sender device, the secondary station assuredly returns a response to the primary station, since the primary station initially transmits the station discovery command and not the second connect request command, when establishing connection between the primary station and any one of the foregoing secondary stations.

As such, the primary station can be assuredly connected to the secondary station. Particularly, the communication apparatus or the communication method assures connection with an illegal response sender device based on the first protocol.

INDUSTRIAL APPLICABILITY

The invention is widely applicable to a communication apparatus, and is suitably used particularly for a communication apparatus which has an optical communication function, for example a portable-type wireless communication apparatus such as a notebook PC, a PDA, a mobile phone, and a digital camera.

The invention claimed is:

1. A communication apparatus which serves as a primary station for communicating with a secondary station,
    said communication apparatus comprising:
    a first protocol control unit for transmitting (i) a station discovery command with which to confirm a presence of the secondary station, and (ii) a first connect request command, after the station discovery command is transmitted and when a response to the station discovery command is received, so as to carry out connection processing;
    a second protocol control unit for transmitting a second connect request command so as to carry out connection processing, without transmitting the station discovery command for confirming said presence of the secondary station; and
    a protocol switching unit for causing the second protocol control unit to transmit the second connect request command, in a case where said response to the station discovery command has not been received after an elapse of a predetermined time since the station discovery command was transmitted before transmission of the second connect request command.

2. The communication apparatus as set forth in claim 1, further comprising:
    a message presenting unit for presenting a predetermined message for urging the secondary station to be made in a receptive state, before the protocol switching unit causes the first protocol control unit to initially transmit the station discovery command.

3. The communication apparatus as set forth in claim 2, wherein the first protocol is an IrDA (Infrared Data Association) protocol, and the second protocol is an IrSimple protocol.

4. The communication apparatus as set forth in claim 1, wherein the first protocol is an IrDA (Infrared Data Association) protocol, and the second protocol is an IrSimple protocol.

5. A communication method for a communication apparatus serving as a primary station which communicates with a secondary station, said communication method comprising the steps of:
(a) transmitting (i) a station discovery command with which to confirm a presence of the secondary station, and (ii) a first connect request command, after the station discovery command is transmitted and when a response the station discovery command is received, so as to carry out connection processing;
(b) transmitting a second connect request command so as to carry out connection processing, without transmitting the station discovery command for confirming said presence of the secondary station; and
(c) causing the second connect request command to be transmitted in the step (b), in a case where said response to the station discovery command has not been received after an elapse of a predetermined time since the station discovery command was transmitted before transmission of the second connect request command.

6. A communication apparatus which serves as a primary station for communicating with a secondary station, wherein
the communication apparatus is switchable between a first protocol and a second protocol at a time when communication connection is to be established with the secondary station, the first protocol causing transmission of (i) a station discovery command with which to confirm a presence of the secondary station, and (ii) a first connect request command, after the station discovery command is transmitted when a response the station discovery command is received, for carrying out data communication based on the first protocol, so as to carry out connection processing, and the second protocol causing transmission of a second connect request command for carrying out data communication based on the second protocol,
the station discovery command is transmitted before the second connect request command is transmitted, and in a case where said response to the station discovery command is received, the first connect request command is transmitted,
the second connect request command is transmitted in a case where the response to the station discovery command has not been received after an elapse of a predetermined time since the station discovery command was transmitted.

7. A program for causing a computer to function as a communication apparatus, the communication apparatus including:
a first protocol control unit for transmitting (i) a station discovery command with which to confirm a presence of the secondary station, and (ii) a first connect request command, after the station discovery command is transmitted and when a response to the station discovery command is received, so as to carry out connection processing;
a second protocol control unit for transmitting a second connect request command so as to carry out connection processing, without transmitting the station discovery command for confirming said presence of the secondary station; and
a protocol switching unit for causing the second protocol control until to transmit the second connect request command, in a case where said response to the station discovery command has not been received after an elapse of a predetermined time since the station discovery command was transmitted before transmission of the second connect request command.

8. The program as set forth in claim 7, wherein:
the communication apparatus further includes a message presenting unit for presenting a predetermined message for urging the secondary station to be made in a receptive state, before the protocol switching unit causes the first protocol control unit to initially transmit the station discovery command.

9. The program as set forth in claim 8, wherein the first protocol is an IrDA (Infrared Data Association) protocol, and the second protocol is an IrSimple protocol.

10. The program as set forth in claim 7, wherein the first protocol is an IrDA (Infrared Data Association) protocol, and the second protocol is an IrSimple protocol.

11. A non-transitory computer-readable recording medium in which a program is recorded, the program causing a computer to function as a communication apparatus, the communication apparatus including:
a first protocol control unit for transmitting (i) a station discovery command with which to confirm a presence of the secondary station, and (ii) a first connect request command, after the station discovery command is transmitted and when a response to the station discovery command is received, so as to carry out connection processing;
a second protocol control unit for transmitting a second connect request command so as to carry out connection processing, without transmitting the station discovery command for confirming said presence of the secondary station; and
a protocol switching unit for causing the second protocol control unit to transmit the second connect request command, in a case where said response to the station discovery command has not been received after an elapse of a predetermined time since the station discovery command was transmitted before transmission of the second connect request command.

12. The non-transitory computer-readable recording medium as set forth in claim 11, wherein:
the communication apparatus further includes a message presenting unit for presenting a predetermined message for urging the secondary station to be made in a receptive state, before the protocol switching unit causes the first protocol control unit to initially transmit the station discovery command.

13. The non-transitory computer-readable recording medium as set forth in claim 12, wherein the first protocol is an IrDA (Infrared Data Association) protocol, and the second protocol is an IrSimple protocol.

14. The non-transitory computer-readable recording medium as set forth in claim 11, wherein the first protocol is an IrDA (Infrared Data Association) protocol, and the second protocol is an IrSimple protocol.

15. A communication circuit for functioning as a communication apparatus, the communication apparatus including:
a first protocol control unit for transmitting (i) a station discovery command with which to confirm a presence of the secondary station, and (ii) a first connect request command, after the station discovery command is transmitted and when a response to the station discovery command is received, so as to carry out connection processing;

a second protocol control unit for transmitting a second connect request command so as to carry out connection processing, without transmitting the station discovery command for confirming said presence of the secondary station; and a protocol switching unit for causing the second protocol control unit to transmit the second connect request command, in a case where said response to the station discovery command has not been received after an elapse of a predetermined time since the station discovery command was transmitted before transmission of the second connect request command.

16. The communication circuit as set forth in claim 15, wherein:

the communication apparatus further includes a message presenting unit for presenting a predetermined message for urging the secondary station to be made in a receptive state, before the protocol switching unit causes the first protocol control unit to initially transmit the station discovery command.

17. The communication circuit as set forth in claim 16, wherein the first protocol is an IrDA (Infrared Data Association) protocol, and the second protocol is an IrSimple protocol.

18. The communication circuit as set forth in claim 15, wherein the first protocol is an IrDA (Infrared Data Association) protocol, and the second protocol is an IrSimple protocol.

19. A mobile phone comprising a communication apparatus, the communication apparatus including:

a first protocol control unit for transmitting (i) a station discovery command with which to confirm a presence of the secondary station, and (ii) a first connection request command, after the station discovery command is transmitted and when a response to the station discovery command is received, so as to carry out connection processing;

a second protocol control unit for transmitting a second connect request command so as to carry out connection processing, without transmitting the station discovery command for confirming said presence of the secondary station; and a protocol switching unit for causing the second protocol control unit to transmit the second connect request command, in a case where said response to the station discovery command has not been received after an elapse of a predetermined time since the station discovery command was transmitted before transmission of the second connect request command.

20. The mobile phone as set forth in claim 19, wherein:

the communication apparatus further includes a message presenting unit for presenting a predetermined message for urging the secondary station to be made in a receptive state, before the protocol switching unit causes the first protocol control unit to initially transmit the station discovery command.

21. The mobile phone as set forth in claim 20, wherein the first protocol is an IrDA (Infrared Data Association) protocol, and the second protocol is an IrSimple protocol.

22. The mobile phone as set forth in claim 19, wherein the first protocol is an IrDA (Infrared Data Association) protocol, and the second protocol is an IrSimple protocol.

* * * * *